US009847742B2

(12) United States Patent
Suzuki et al.

(10) Patent No.: US 9,847,742 B2
(45) Date of Patent: Dec. 19, 2017

(54) LINEAR MOTOR CONTROL APPARATUS AND LINEAR MOTOR CONTROL SYSTEM

(71) Applicant: CANON KABUSHIKI KAISHA, Tokyo (JP)

(72) Inventors: Norihiro Suzuki, Yokohama (JP); Takeshi Yamamoto, Fujisawa (JP); Koji Tomoda, Machida (JP); Satoru Deguchi, Yokohama (JP); Hidetada Narahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/682,412

(22) Filed: Apr. 9, 2015

(65) Prior Publication Data
US 2015/0303841 A1 Oct. 22, 2015

(30) Foreign Application Priority Data

Apr. 18, 2014 (JP) ................................. 2014-086367

(51) Int. Cl.
H02P 6/00 (2016.01)
B65G 35/06 (2006.01)
(Continued)

(52) U.S. Cl.
CPC ............. *H02P 6/006* (2013.01); *B65G 35/06* (2013.01); *B65G 54/02* (2013.01); *H02P 6/16* (2013.01); *H02P 6/28* (2016.02); *H02P 25/06* (2013.01)

(58) Field of Classification Search
CPC ......... H02P 6/006; H02P 25/06; B65G 54/02; B65G 35/06
(Continued)

(56) References Cited

U.S. PATENT DOCUMENTS 4,454,457 A * 6/1984 Nakamura ............ B60L 15/005
104/292
6,011,508 A * 1/2000 Perreault ................. B61L 3/225
246/122 R (Continued)

FOREIGN PATENT DOCUMENTS

JP 2831166 B2 12/1998

*Primary Examiner* — Shawki S Ismail
*Assistant Examiner* — Muhammad S Islam
(74) *Attorney, Agent, or Firm* — Fitzpatrick, Cella, Harper & Scinto

(57) ABSTRACT

A linear motor control apparatus includes a plurality of coil units which are continuously arranged, a plurality of position detecting units configured to detect positions of a first truck and a second truck which move over the plurality of coil units, and a first deviation calculating unit configured to arithmetically operate deviation information as differences between values of the plurality of position detecting units and a target position. In addition, a first position control unit arithmetically operates current control signals on the basis of the deviation information, a first current control unit supplies driving currents to the plurality of coil units on the basis of the current control signals, and a switching unit outputs the values of the plurality of position detecting units for the first truck to the first position control unit and outputs the values of the plurality of position detecting units for the second truck to a second position control unit.

11 Claims, 14 Drawing Sheets

(51) Int. Cl.
  *H02P 25/06* (2016.01)
  *B65G 54/02* (2006.01)
  *H02P 6/16* (2016.01)
  *H02P 6/28* (2016.01)

(58) Field of Classification Search
  USPC .......................................................... 318/38
  See application file for complete search history.

(56) References Cited

U.S. PATENT DOCUMENTS

| | | | |
|---|---|---|---|
| 6,876,896 B1* | 4/2005 | Ortiz | B29C 65/02 |
| | | | 318/135 |
| 2008/0006172 A1* | 1/2008 | Thornton | B60L 13/03 |
| | | | 104/292 |
| 2012/0091928 A1* | 4/2012 | Markon | H02K 41/031 |
| | | | 318/135 |
| 2012/0098469 A1* | 4/2012 | Takeuchi | H02K 41/031 |
| | | | 318/135 |
| 2012/0139455 A1* | 6/2012 | Tojo | H02K 41/03 |
| | | | 318/135 |
| 2013/0229134 A1* | 9/2013 | Sato | H02K 41/031 |
| | | | 318/135 |

* cited by examiner

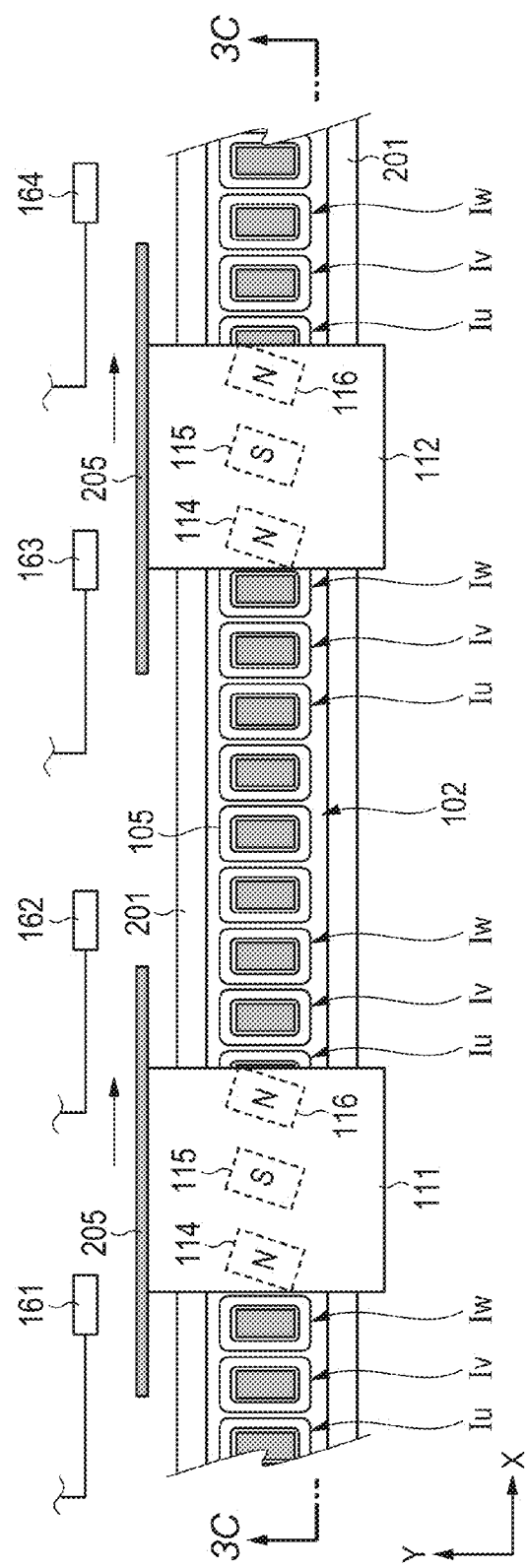
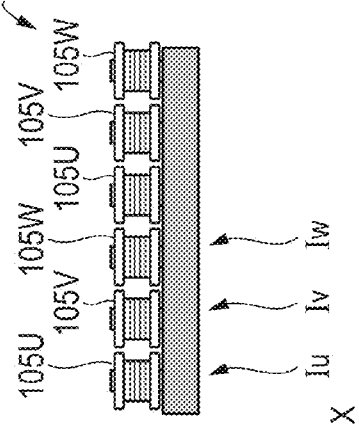
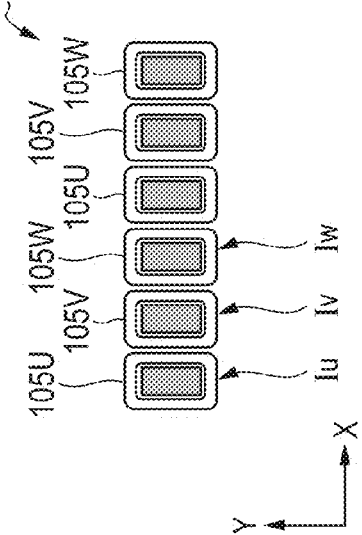

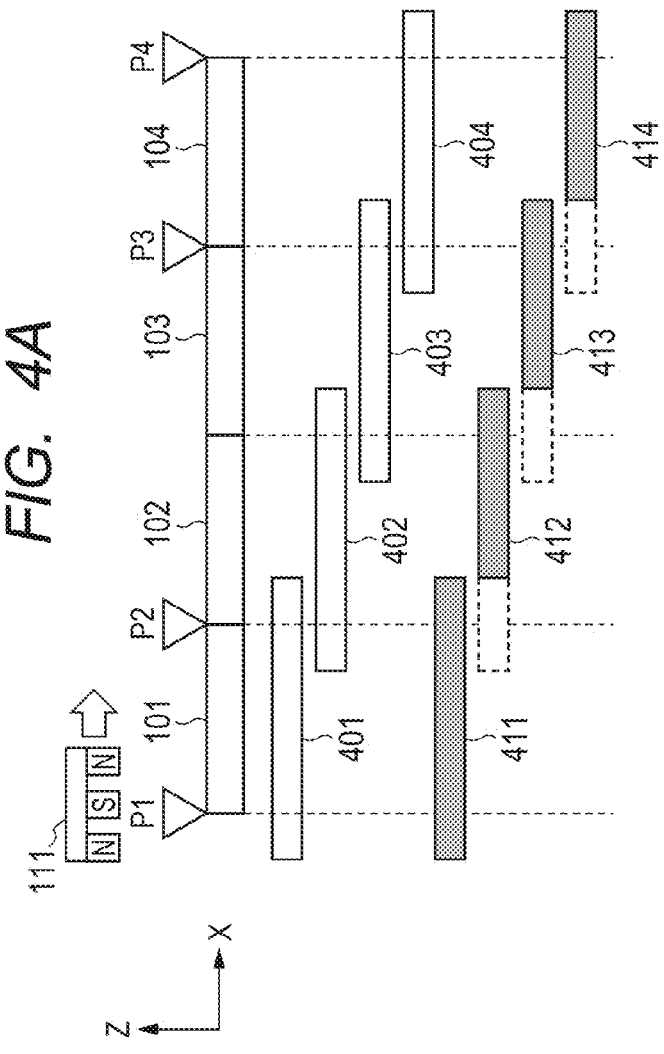
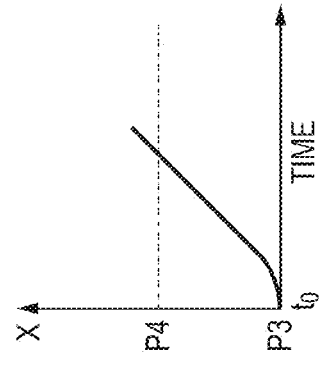
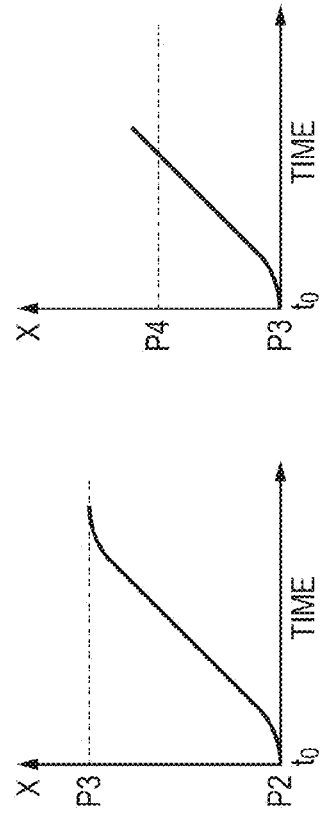
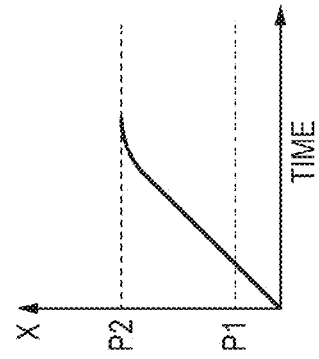

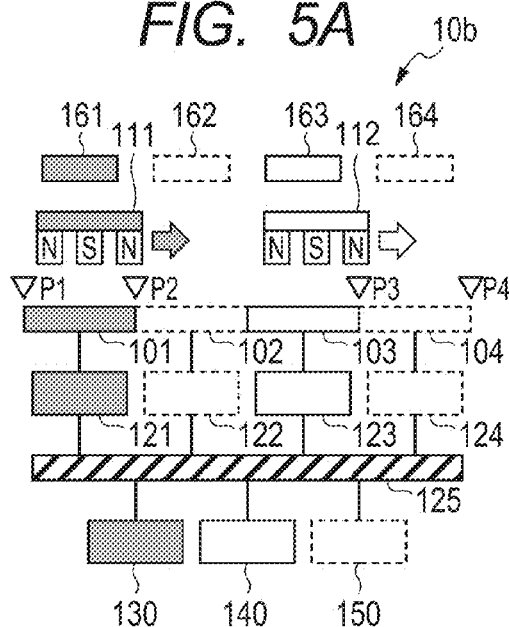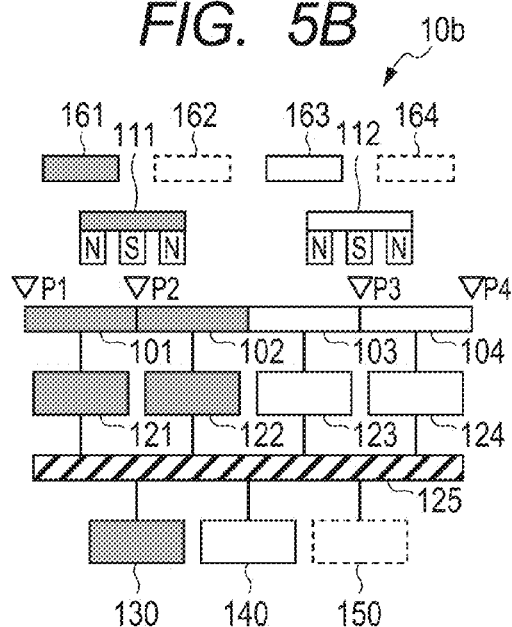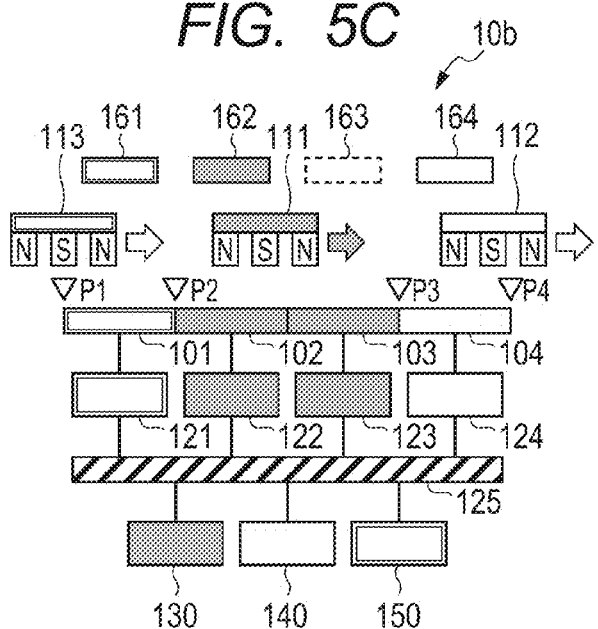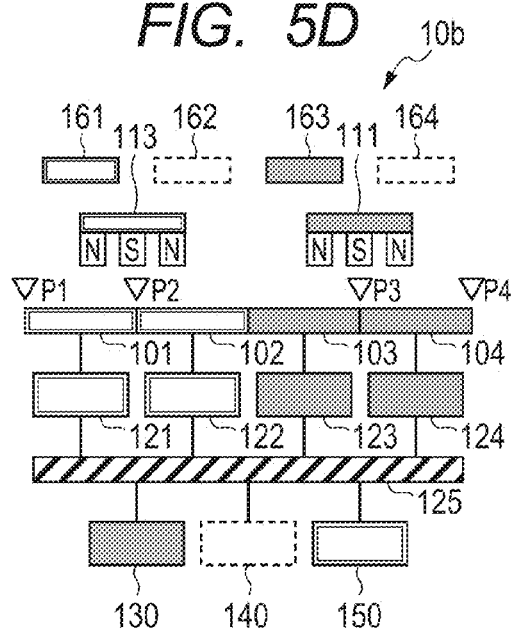

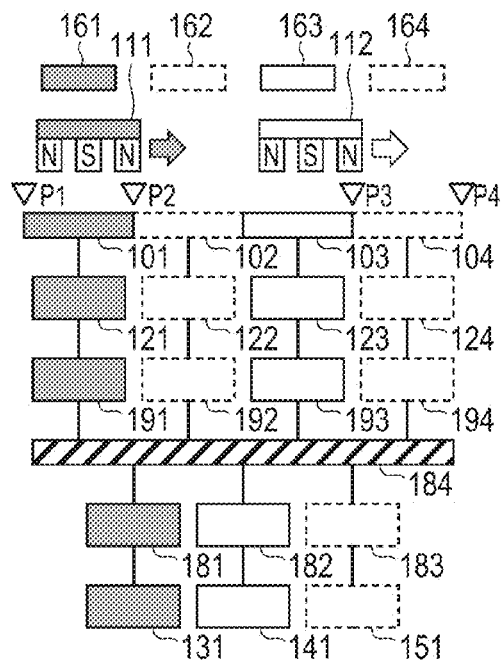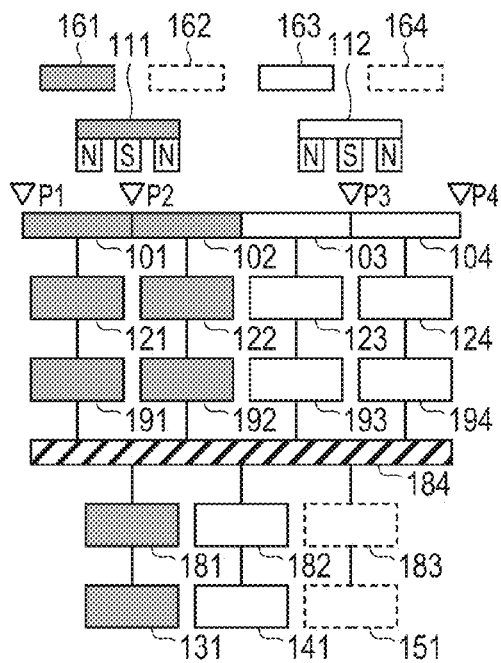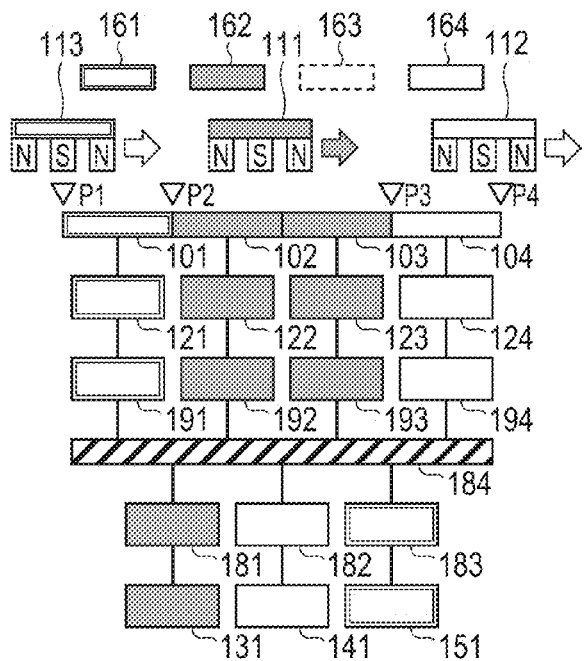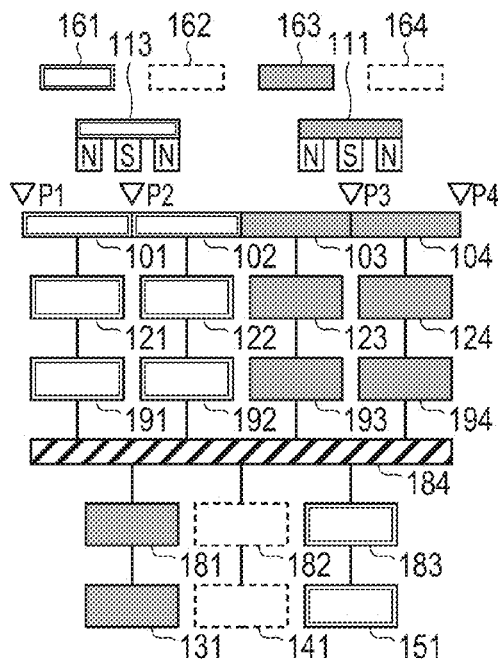

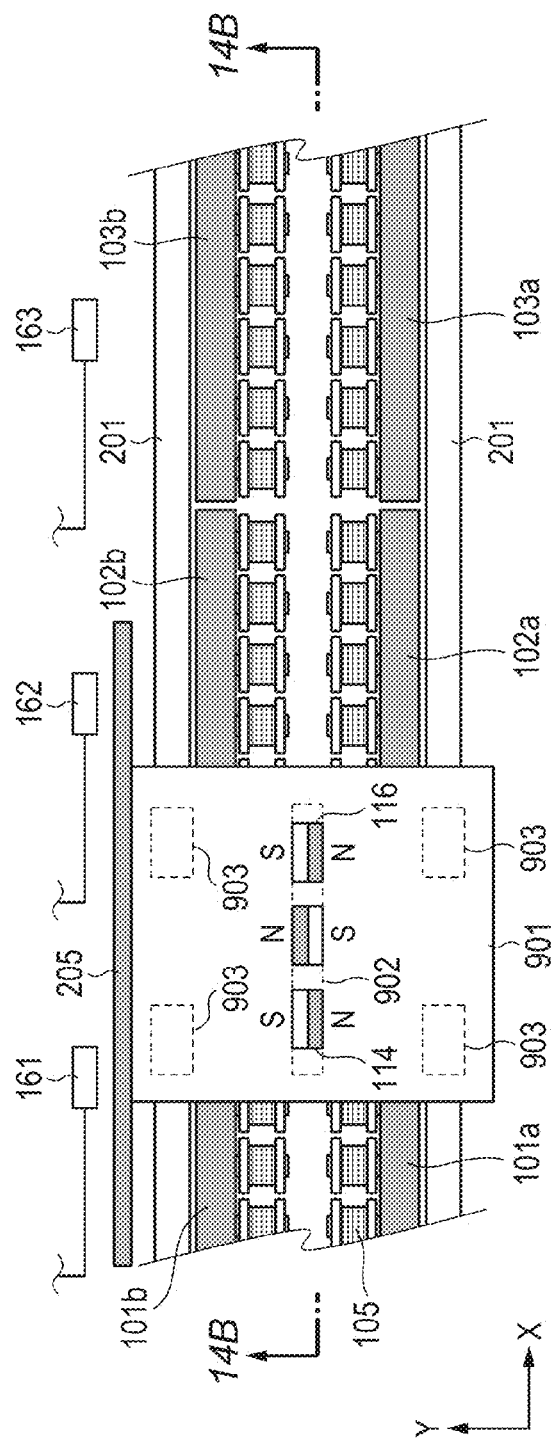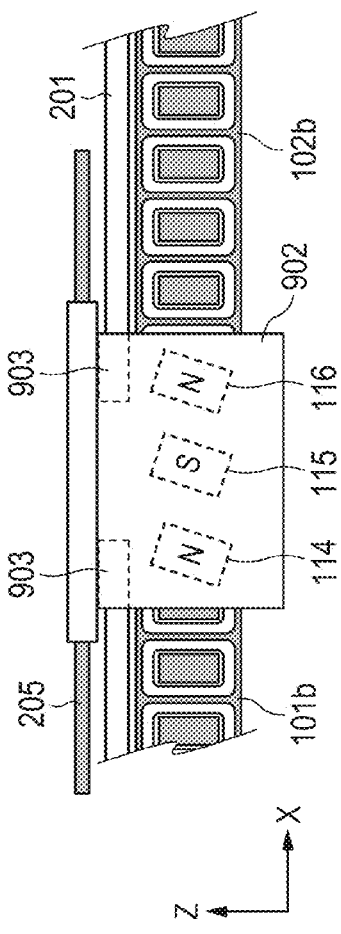
FIG. 14A
FIG. 14B

LINEAR MOTOR CONTROL APPARATUS AND LINEAR MOTOR CONTROL SYSTEM

BACKGROUND OF THE INVENTION

Field of the Invention

The present invention relates to a linear motor and, more particularly, to a linear motor control apparatus of a linear motor of a moving magnet type and a linear motor control system.

Description of the Related Art

A linear motor of a moving magnet type has such a construction that a magnet is arranged in a truck serving as a needle and a coil is arranged in a stator, respectively, and is suitable for conveyance of a long stroke as compared with a linear motor of a moving coil type in which an electric wire is connected to a truck. In such a moving magnet type linear motor, when a driving stroke longer than a size of needle is necessary, a plurality of coils corresponding to a stroke length are necessary. Generally, the moving magnet type linear motor has such a construction that a plurality of coils are arranged and connected to a current controller so that current control by three phases can be made (refer to Japanese Patent No. 2831166). According to such a construction, if all of the three-phase coils are connected to the same current controller so that those phases are serially connected, a thrust can be generated. However, it is difficult to individually control the plurality of trucks on the same conveying path.

Therefore, a coil unit comprising a plurality of coils is constructed, a linear motor module having a motor controller for controlling a position of one truck is constructed so as to correspond to one coil unit, and a plurality of trucks are individually controlled.

Generally, such a construction that a plurality of linear motor modules are continuously arranged, a long stroke conveyance is attained, and the plurality of trucks on the same orbit are controlled is known.

In a conveying apparatus for FA (Factory Automation), it is required that a plurality of trucks are arranged at a high density, the truck is moved at a high speed, the truck is stopped at a high precision, and a restriction to a stop position of the truck is small.

However, in such a construction that the linear motor modules are simply arranged, when one truck stops at a boundary position between the adjacent linear motor modules, the truck stops at a boundary position between the adjacent coil units. In this case, since the truck is simultaneously controlled from two motor controllers for respectively controlling the adjacent coil units, it is difficult to stop the truck at a high precision.

In the case of controlling one truck by using the motor controller of one of the adjacent linear motor modules, although the truck can be stopped by driving one of the coil units, a thrust which is applied to the truck is reduced to the half. On the other hand, in order to allow the truck to obtain a thrust which is equal to that in the case where both of the adjacent coil units were driven, it is necessary to supply a double driving current to one coil unit and costs of an electric circuit are high. Therefore, such a construction is undesirable.

According to Japanese Patent No. 2831166, a thrust command serving as current control information is generated by one position detector and one motor controller and the same thrust command is transmitted to a plurality of current controllers, thereby driving a plurality of continuous coil units and controlling one truck. However, according to such a construction, although the truck can be stopped at the boundary position between the coil units while keeping the thrust which is applied to one truck, a plurality of trucks cannot be controlled.

SUMMARY OF THE INVENTION

The invention is made to solve the foregoing problem and it is an aspect of the invention to provide a linear motor control apparatus which enables a plurality of trucks which move at a high speed to be controlled at a high precision.

To accomplish the above aspect, according to the invention, there is provided a linear motor control apparatus comprising: a plurality of coil units which are continuously arranged; a plurality of position detecting units configured to detect positions of a plurality of trucks which move over the plurality of coil units; a plurality of deviation calculating units configured to calculate deviation information serving as differences between the detected positions of the trucks and a target position; a plurality of position control units configured to arithmetically operate current control signals on the basis of the deviation information; a plurality of current control units configured to supply driving currents to the plurality of coil units on the basis of the current control signals; and a switching unit configured to switch the position control units to which the deviation information is transmitted or to switch the current control units to which the current control signals are transmitted.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3A is an operation explanatory diagram of the linear motor module according to the first embodiment of the invention and is a top view of a part of a moving magnet type linear motor illustrated in FIG. 2.

FIG. 3B is a top view illustrating a coil unit in FIG. 3A.

FIG. 3C is a side elevational view of the coil unit illustrated in FIG. 3B.

FIG. 4A is a diagram illustrating control areas of the coil units.

FIG. 4B is a graph illustrating a target position of a truck at positions illustrated in FIG. 4A.

FIG. 4C is a graph illustrating a target position of the truck at positions illustrated in FIG. 4A.

FIG. 4D is a graph illustrating a target position of the truck at the positions illustrated in FIG. 4A.

FIG. 5A shows control states illustrating the movement of the trucks.

FIG. 5B shows control states illustrating the stop of the trucks.

FIG. 5C shows a control state of a truck which enters newly.

FIG. 5D shows control states illustrating the stop of the trucks.

FIG. 10A shows a control state illustrating the movement of the trucks.

FIG. 10B shows a control state illustrating the stop of the trucks.

FIG. 10C shows a control state of a truck which enters newly.

FIG. 10D shows a control state illustrating the stop of the trucks.

FIG. 14A is a top view of a linear motor.

FIG. 14B is a cross sectional view taken along the line 14B-14B in FIG. 14A.

DESCRIPTION OF THE EMBODIMENTS

Preferred embodiments of the present invention will now be described in detail in accordance with the accompanying drawings.

First Embodiment

Figure 1:
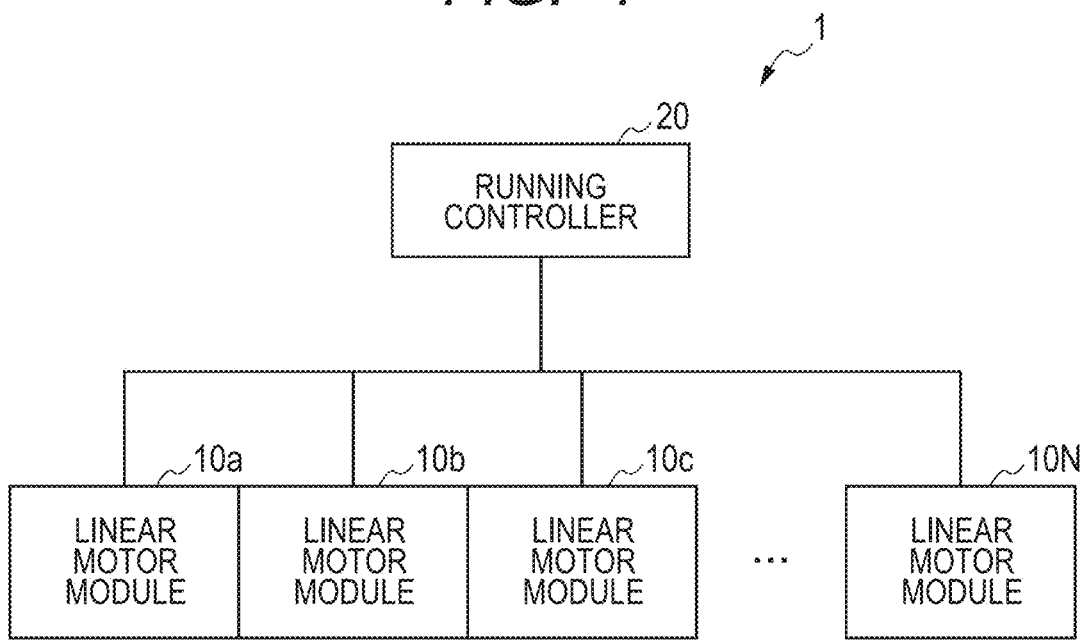
FIG. 1 is a schematic constructional diagram of a linear motor control system according to the first embodiment of the invention.

The first embodiment of the invention will be described hereinbelow with reference to the drawings. FIG. 1 is a schematic constructional diagram of a linear motor control system 1 according to the first embodiment of the invention. As illustrated in FIG. 1, the linear motor control system 1 has: linear motor modules 10a to 10N serving as linear motor control apparatuses; and a running controller 20 serving as a running control unit. The linear motor control system 1 is a moving magnet type linear motor. In the embodiment, for example, the linear motor control system 1 has the N (N is an integer of 2 or more) linear motor modules 10a to 10N.

The linear motor modules 10a to 10N are continuously arranged and construct one conveying path. Trucks which move in the linear motor control system 1 are controlled by the linear motor modules 10a to 10N and move or stop on the conveying path.

The running controller 20 controls the linear motor modules 10a to 10N. When describing in detail, for all trucks existing in the linear motor control system 1, the running controller 20 transmits a driving profile serving as a driving command showing a target position of the truck to time to the linear motor modules 10a to 10N. The running controller 20 transmits a start signal serving as a group conveying command to the linear motor modules 10a to 10N so as to move, in a lump, the trucks existing in the linear motor control system 1. When the operations of the linear motor modules 10a to 10N become abnormal, the running controller 20 receives error signals from the linear motor modules 10a to 10N and, for example, makes control to stop all of the linear motor modules 10a to 10N, or the like.

Figure 2:
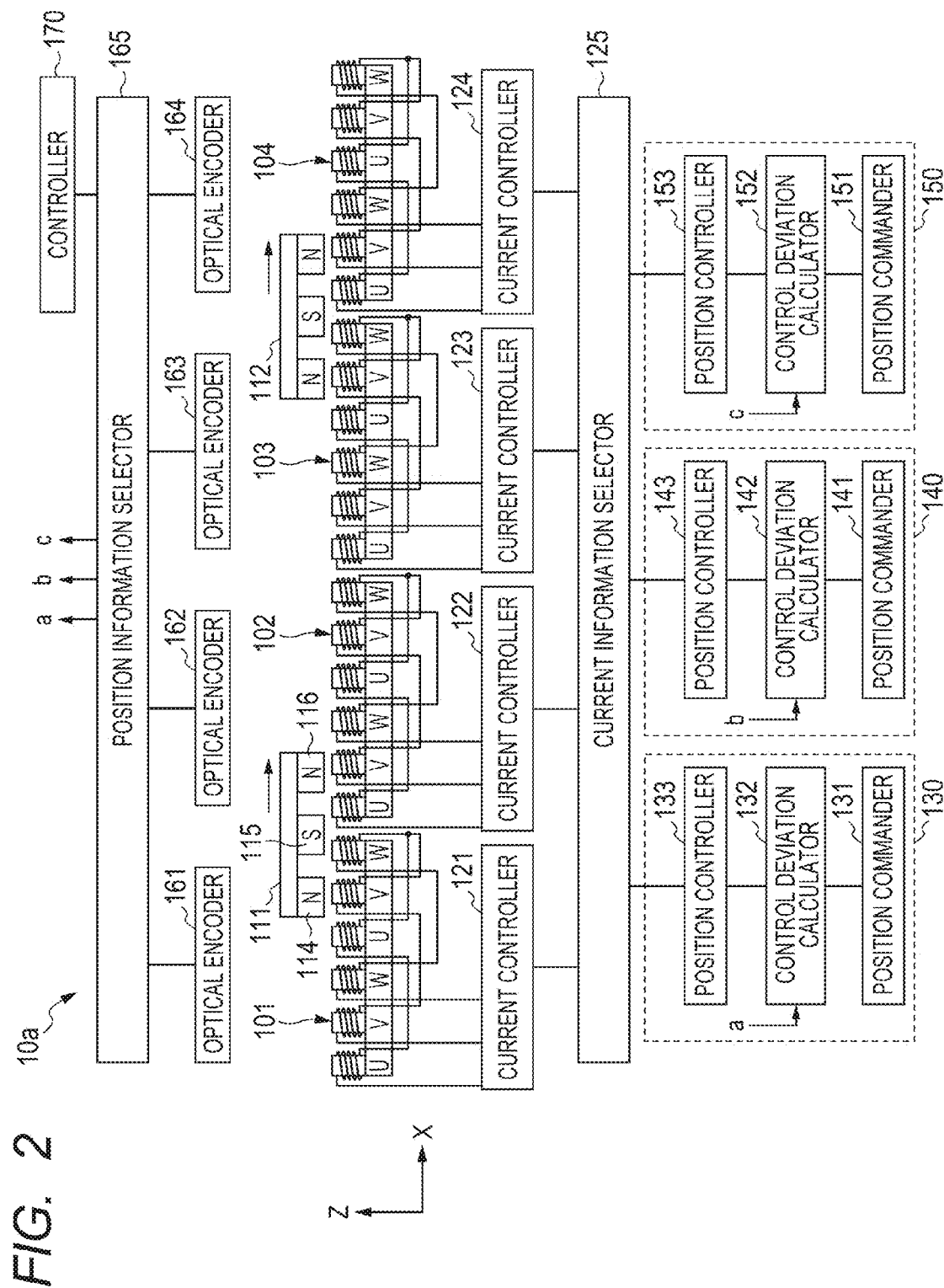
FIG. 2 is a schematic constructional diagram of a linear motor module according to the first embodiment of the invention.

FIG. 2 is a schematic constructional diagram of the linear motor module 10a according to the first embodiment of the invention. FIG. 3A is a top view of a part of the moving magnet type linear motor illustrated in FIG. 2. FIG. 3B is a top view illustrating a coil unit in FIG. 3A. FIG. 3C is a side elevational view of the coil unit illustrated in FIG. 3B. Each of the linear motor modules 10b to 10N has a construction similar to that of the linear motor module 10a illustrated in FIG. 2. In FIGS. 2 and 3A to 3C, it is defined that an X axis is a progressing direction in which trucks 111 and 112 move, a Y axis is a horizontal direction directing toward a scale 205 when seen from the truck 111, and a Z axis is a vertical direction in which the trucks 111 and 112 are assumed to be an upper side when seen from coil units 101 to 104.

The linear motor module 10a has the plurality of coil units 101 to 104. By continuously arranging the plurality of coil units 101 to 104, a conveying path of the trucks 111 and 112 is formed. In detail, as illustrated in FIG. 3A, by arranging two rails 201 and 201 onto an apparatus stage (not shown) in parallel, the conveying path for the trucks 111 and 112 is formed. By continuously arranging the plurality of coil units 101 to 104 between the two rails 201 and 201, the linear motor conveying path of a long stroke is formed.

The trucks 111 and 112 have the same specifications and each truck has: magnets 114 to 116 serving as needles; the scale 205; and a moving block (not shown). The moving blocks and the rails 201 are members constructing a linear guide. The linear guide moves along the rails 201 through a plurality of balls held in the moving blocks. The trucks 111 and 112 having such moving blocks move along an orbit formed by the two rails 201 and 201 by the linear guide. The embodiment is merely shown as an example and may have a monorail structure constructed by a single rail 201.

In the embodiment, in each of the coil units 101 to 104, a plurality of coils 105 are arranged so as to enable a three-phase driving comprising a plurality of phases, that is, a U phase, a V phase, and a W phase. As illustrated in FIGS. 2, 3B, and 3C, the coil unit 101 is constructed by six coils 105 in which every two coils 105 of the U phase, V phase, and W phase are serially connected. Each of the coil units 102 to 104 also has a construction similar to that of the coil unit 101.

Although the coil unit 101 is constructed by combining the plurality of coils 105 and cores formed with flat rolled magnetic steel sheets and strip, it may be constructed without using any core. Although a length of one coil unit 101 may be set to, for example, 100 mm, it is not limited to such a length. The number of coil units 101 which are serially connected is not limited but the coil unit 101 may be constructed by three coils forming three phases of the U phase, V phase, and W phase.

The coil units 101 to 104 continuously arranged as illustrated in FIG. 2 are respectively electrically connected to current controllers 121 to 124 serving as current control units by electric lines such as power electric wires. Each of the current controllers 121 to 124 supplies currents to each of the corresponding coil units 101 to 104 in such a manner that a current Iu of the U phase is supplied to a coil 105U, a current Iv of the V phase is supplied to a coil 105V, and a current Iw of the W phase is supplied to a coil 105W, respectively. Thus, each of the coils 105U, 105V, and 105W is excited by the current supply and each of the coil units 101 to 104 can control the trucks 111 and 112.

The current controllers 121 to 124 are connected to a current information selector 125 serving as a switching unit. The current controller selected by the current information selector 125 supplies a driving current to the corresponding coil unit. The current information selector 125 is connected to motor controllers 130, 140, and 150. On the basis of current control information exchange signals which are transmitted from the motor controllers 130, 140, and 150, the current information selector 125 selects one or a plurality of current controllers 121 to 124 as input destinations of the current control information which is output from the motor controllers, and switches the selected ones of the current controllers 121 to 124. The current control information exchange signal is a signal for allowing the current information selector 125 to select one or a plurality of current controllers for supplying the currents to the coil units for controlling the truck as a control target. Although the motor controller 130 will be described hereinbelow, each of the motor controllers 130, 140, and 150 has the same construction.

The motor controller 130 has: a position commander 131 to make running control of the truck; a control deviation calculator 132 serving as a deviation calculating unit; and a position controller 133 serving as a position control unit. The position commander 131 outputs position command information serving as a target position of the truck as a control target to the control deviation calculator 132. The position commander 131 outputs the position command information of the truck to the control deviation calculator 132 on the basis of the driving profile transmitted from the running controller 20. The control deviation calculator 132 calculates a difference between the position command information which was output from the position commander 131 and the position of the truck which is output from one of a plurality of optical encoders 161 to 164 and outputs an obtained difference as control deviation information.

The position controller 133 makes PID (Proportional Integral Derivative Controller) control by the control deviation information calculated in the control deviation calculator 132 and outputs current control information serving as a current control signal. The current control information exchange signal which is output from the motor controller 130 may be formed by the position controller 133.

The motor controller 140 has a position commander 141, a control deviation calculator 142, and a position controller 143. The motor controller 150 has a position commander 151, a control deviation calculator 152, and a position controller 153. The position commanders 141 and 151 have the same function as that of the position commander 131. The control deviation calculators 142 and 152 have the same function as that of the control deviation calculator 132. The position controllers 143 and 153 have the same function as that of the position controller 133. Although the linear motor module 10a has the three motor controllers 130, 140, and 150 in the embodiment, it is sufficient that there are motor controllers of the number as many as the number of trucks serving as control targets and the number of motor controllers is not limited to three. The driving profile transmitted from the running controller 20 to each of the motor controllers 130, 140, and 150 may be stored into a memory (not shown) which can be accessed by each of the position commanders 131, 141, and 151.

By detecting the position of the scale 205 by the optical encoders 161 to 164 serving as position detecting units, the positions of the trucks 111 and 112 can be identified. In the embodiment, a relation between the positions where the plurality of optical encoders 161 to 164 are arranged and a length of scale 205 is such a relation that even if the trucks 111 and 112 are located at any positions on the linear motor conveying path, they can be detected.

It is desirable that the optical encoders 161 to 164 have a resolution of a few μm per count. In the embodiment, the optical encoder 161 is arranged in such a manner that a detection range of the optical encoder 161 corresponds to a control area of the coil unit 101. Similarly, the optical encoders 162 to 164 are arranged in such a manner that detection ranges of the optical encoders 162 to 164 correspond to control areas of the coil units 102 to 104, respectively.

The layout of the optical encoders 161 to 164 is not limited to such a layout and the number of optical encoders which are arranged is not limited. Although the embodiment has been described with respect to the optical encoders 161 to 164, the invention is not limited to the optical encoders but arbitrary encoders may be used so long as the positions of the trucks can be detected and, for example, magnetic encoders may be used. For example, it is possible to use such a layout that a plurality of encoders are arranged at regular intervals to the control area of one coil unit 101, the encoders are continuously switched in accordance with the positions of the trucks, and the positions are detected. Although absolute type encoders are used as optical encoders 161 to 164 in the embodiment, the optical encoders 161 to 164 are not limited to the absolute type but may be an increment type.

A position information selector 165 serving as a selecting unit is connected to the optical encoders 161 to 164, respectively. Reference characters a, b, and c of the position information selector 165 illustrated in FIG. 2 denote that they are connected to the corresponding reference characters a, b, and c, respectively. That is, the position information selector 165 is connected to the control deviation calculators 132, 142, and 152 provided for the motor controllers 130, 140, and 150, respectively.

A controller 170 serving as an allocating unit is connected to the position information selector 165 and is further connected to the motor controllers 130, 140, and 150, respectively (not shown). The controller 170 allocates the trucks detected by the optical encoders 161 to 164 to any one of the motor controllers 130, 140, and 150 and transmits a position information selection signal serving as allocation information to the position information selector 165. On the basis of the position information selection signal transmitted from the controller 170, the position information selector 165 can combine any one of the motor controllers 130, 140, and 150 and any one of the optical encoders 161 to 164 so that they can communicate with each other.

From each of the motor controllers 130, 140, and 150, the controller 170 receives control state information showing whether each of the motor controllers 130, 140, and 150 is controlling the trucks 111 and 112 or is in a rest state where it does not control the trucks 111 and 112. The controller 170 stores the control state information into a memory or the like (not shown) so that the positions of the trucks detected by the optical encoders can be transmitted to the motor controller in the rest state.

Figure 6:
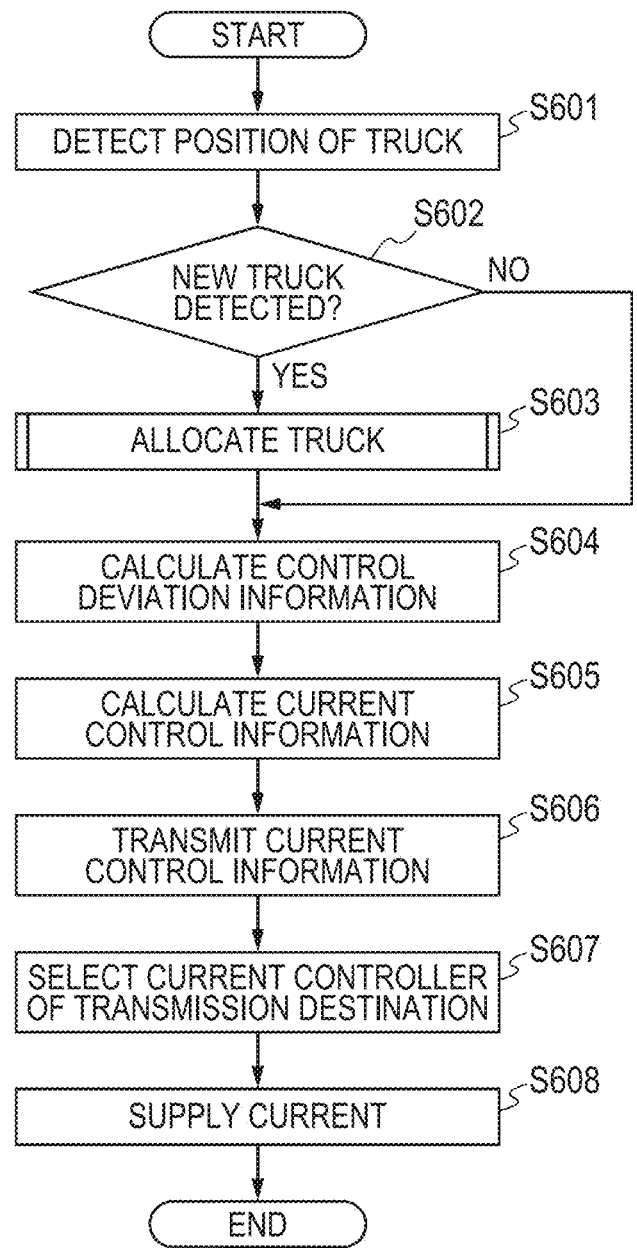
FIG. 6 is a flowchart illustrating control of the trucks according to the first embodiment of the invention.
Figure 7:
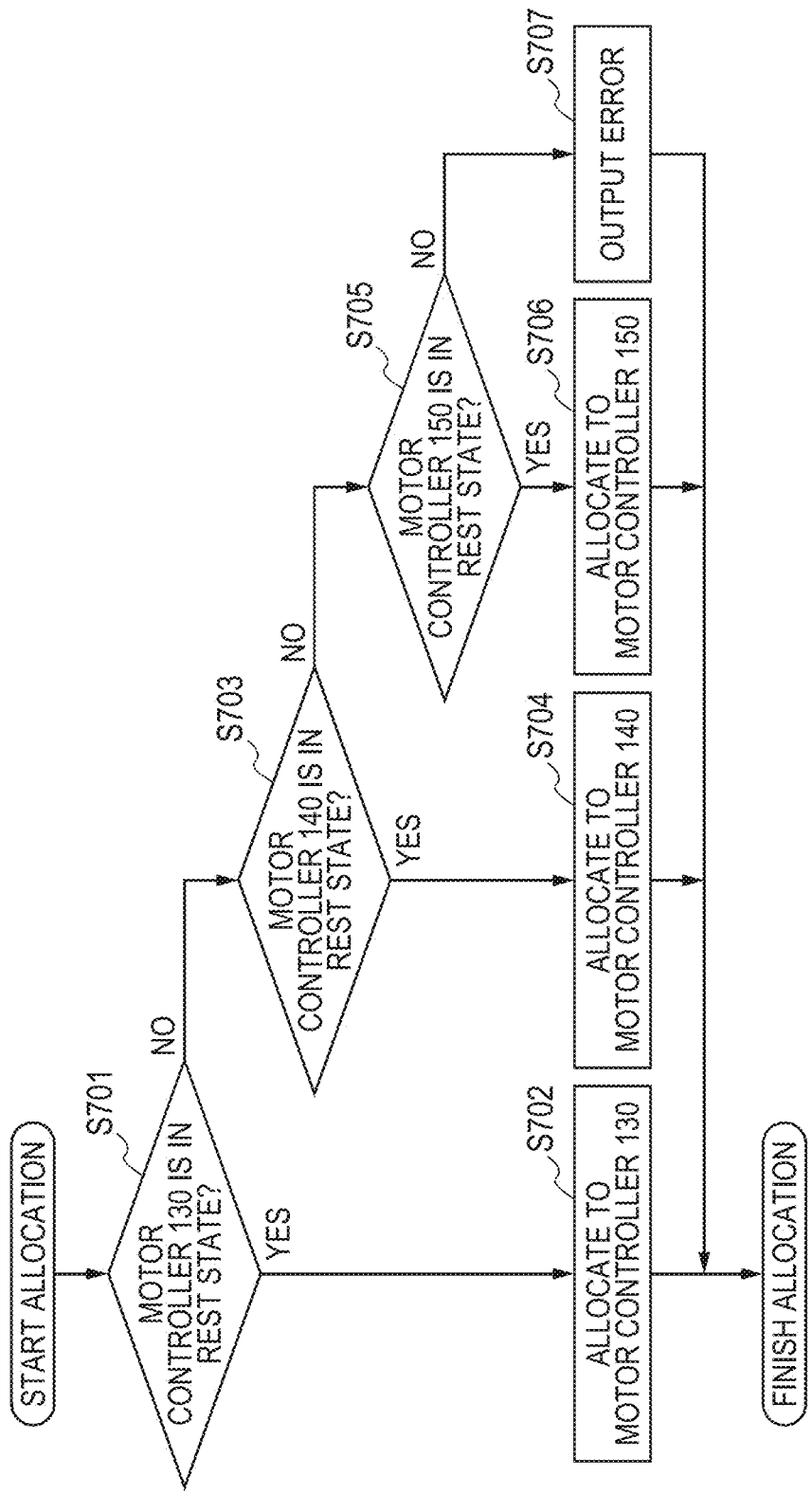
FIG. 7 is a flowchart illustrating an allocating process of the trucks illustrated in FIG. 6.

Control of the trucks using the linear motor modules will be described hereinbelow. FIG. 4A is a diagram illustrating the control areas of the coil units 101 to 104. FIG. 4B illustrates a target position of the truck 111 at positions P1 and P2. FIG. 4C illustrates a target position of the truck 111 at positions P2 to P3. FIG. 4D illustrates a target position of the truck 111 at positions P3 to P4. FIG. 5A shows a control state in the movement of the trucks 111 and 112. FIG. 5B shows a control state at the stop of the trucks 111 and 112. FIG. 5C shows control states of the trucks 111 and 112 and a truck 113 which enters newly. FIG. 5D shows a control state at the stop of the trucks 111 and 113. FIG. 6 is a flowchart illustrating control of the trucks 111 to 113 in FIGS. 5A to 5D. FIG. 7 is a flowchart illustrating such a process that the controller 170 allocates the positions detected by the optical encoders to the motor controllers 130, 140, and 150. FIGS. 5A to 5D illustrate a state where the control of the trucks 111 to 113 is time-sequentially arranged. In FIGS. 4A and 5A to 5D, the linear motor module 10b will be described and it is assumed that the linear motor module 10b is located between the linear motor modules 10a and 10c so as to be adjacent thereto. Although the flowcharts shown in FIGS. 6 and 7 will be described with respect to the control of, for example, the linear motor module 10b, it is assumed that the linear motor modules 10a to 10N are also similarly controlled.

As illustrated in FIG. 4A, a range where the coil unit 101 can control the truck 111 corresponds to a control area 401 and, when the truck 111 exists in the control area 401, the coil 101 is in a driving state. Similarly, a range where the coil unit 102 can control the truck 111 corresponds to a control area 402. A range where the coil unit 103 can control the truck 111 corresponds to a control area 403. A range where the coil unit 104 can control the truck 111 corresponds to a control area 404.

A position detection area 411 is an area where the optical encoder 161 can detect the position of the truck. Similarly, an area where the optical encoder 162 can detect the position of the truck is a position detection area 412. An area where the optical encoder 163 can detect the position of the truck is a position detection area 413. An area where the optical encoder 164 can detect the position of the truck is a position detection area 414. In the position detection areas 412 to 414, an area in which a portion shown by a broken line and a portion painted in black are combined is an area where the position of the truck can be detected.

In the optical encoders 161 to 164, the position detection areas of the adjacent encoders overlap. Therefore, it is now assumed that the portions shown by the broken lines in the position detection areas 412 to 414 are areas which do not contribute to the position of the truck 111. For example, the controller 170 or the like couples the four position detection areas 411 to 414 as data, thereby regarding as if they correspond to a position detected by one encoder. Therefore, in the case of detecting as a position of the truck 111 near a boundary between the coil units, for example, near a boundary between the coil units 101 and 102, the position of the truck 111 in the whole coil units 101 to 104 can be obtained. The process for coupling the position detection areas 411 to 414 as data is not limited to the controller 170 but may be executed by the position information selector 165 or by the control deviation calculators 132, 142, and 152, respectively.

The position P1 is a position corresponding to an edge of the linear motor module 10b, that is, an edge of the coil unit 101 on the side where the truck enters from the adjacent linear motor module 10a. The position P2 corresponds to a position of a boundary between the coil units 102 and 103 and is a stop target position of the truck. A position P3 corresponds to a position of a boundary between the coil units 103 and 104 and is a stop target position of the truck. A position P4 is a position corresponding to the edge of the linear motor module 10b, that is, an edge of the coil unit 104 on the side where the truck progresses to the adjacent linear motor module 10c.

The graphs illustrated in FIGS. 4B to 4D indicate the target positions of the positions P1 to P4 corresponding to a time and each of the position commanders 131, 141, and 151 uses such a target position as position command information of the truck. The running controller transmits all of the position command information illustrated in FIGS. 4B to 4D to each of the motor controllers 130, 140, and 150. Each of the motor controllers 130, 140, and 150 may store the target positions received from the running controller 20 into, for example, a memory or the like (not shown) so that the position commanders 131, 141, and 151 can use them as position command information. Time $t_0$ shown in FIGS. 4C and 4D indicates time when each truck has started the movement from the positions P2 and P3.

The control of the trucks will be described hereinbelow on the basis of flowcharts of FIGS. 6 and 7 with reference to FIGS. 5A to 5D. It is assumed that the target positions have already been transmitted from the running controller 20 to each of the motor controllers 130, 140, and 150. In FIGS. 5A to 5D, a stop position interval of the trucks is equal to hundreds of mm, for example, 200 mm. The flowchart shown in FIG. 6 illustrates the control which is made after the running controller 20 started the running of the trucks in a lump.

In FIG. 5A, on the basis of the flowchart of FIG. 7, the controller 170 has already allocated the motor controller 130 to the truck 111 and has already allocated the motor controller 140 to the truck 112. It is assumed that the motor controller 150 is in a rest state and has transmitted a signal showing that the trucks are not controlled to the current information selector 125 and the controller 170. It is also assumed that the optical encoders 162 and 164 have transmitted information showing a state where there are no trucks, that is, information showing that the trucks whose positions are detected do not exist to the position information selector 165. Since each of the motor controllers 130 and 140 executes the same process, in step S604 and subsequent steps in FIG. 6, the motor controller 130 will be described.

The optical encoders 161 and 163 detect the positions of the trucks 111 and 112, respectively (step S601). In FIG. 5A, since the truck 111 is located in the control area of the coil unit 101, the optical encoder 161 detects the position of the truck 111. Since the truck 112 is located in the control area of the coil unit 103, the optical encoder 163 detects the position of the truck 112. The positions of the trucks 111 and 112 detected by the optical encoders 161 and 163 are input to the controller 170 through the position information selector 165.

Subsequently, the controller 170 determines whether or not a new truck to which the motor controller is not allocated in the trucks 111 and 112 detected by the optical encoders 161 and 163 has entered (step S602). In FIG. 5A, since the truck which entered newly does not exist (NO in step S602), the controller 170 does not allocate any motor controller. In step S602, the controller 170 may determine the new truck, for example, on the basis of the presence or absence of the motor controller allocated to the truck detected by the optical encoder.

In FIG. 5A, the truck 111 is controlled by component elements shown by portions painted in black. That is, the optical encoder 161 detects the position information of the truck 111 and the position information selector 165 transmits the position information of the truck 111 to the control deviation calculator 132 of the motor controller 130. Similarly, the optical encoder 163 shown by a black frame line in FIG. 5A detects the position of the truck 112 and the position information selector 165 transmits the position of the truck 112 to the control deviation calculator 142 of the motor controller 140. On the other hand, the motor controller 150 shown by a broken line in FIG. 5A does not control the trucks. The current controllers 122 and 124, coil units 102 and 104, and optical encoders 162 and 164 do not contribute to the control of the trucks 111 and 112.

The motor controller 130 calculates a difference between the target position of the truck 111 and the present position detected by the optical encoder 161 and arithmetically operates control deviation information (step S604). In detail, the control deviation calculator 132 calculates a deviation as a difference between the target position of the truck 111 which is output from the position commander 131 and the present position of the truck 111 detected by the optical encoder 161.

On the basis of the control deviation information calculated by the control deviation calculator 132, the position controller 133 arithmetically operates current control information including a magnitude and a direction of a current for controlling the current controller (step S605). In step S605, the position controller 133 forms a current control information exchange signal for selecting one or a plurality of current controllers necessary to drive the coil units in accordance with the position of the truck 111 among the current controllers 121 to 124. The current control information exchange signal may be formed on the basis of, for example, any one of the position of the truck 111, the target position, the calculated control deviation information, and the like. In the case of FIG. 5A, the truck 111 allocated to the motor controller 130 is located in the control area 401 of the coil unit 101. Therefore, the position controller 133 forms such a current control information exchange signal that the current information selector 125 can select the current controller 121 for supplying the current to the coil unit 101.

The motor controller 130 transmits the current control information arithmetically operated in step S605 and the formed current control information exchange signal to the current information selector 125 (step S606). On the basis of the current control information exchange signal received from the motor controller 130, the current information selector 125 selects the current controller 121 for transmitting the current control information and transmits the current control information to the current controller 121 (step S607).

The current controller 121 supplies a driving current to the coil unit 101 in accordance with the current control information received from the motor controller 130 (step S608). A thrust according to the supplied driving current is generated in the truck 111. The truck 111 is moved by the generated thrust. That is, in the coil unit 101 to which the driving current was supplied, magnetic forces which repel magnetic forces of the magnets 114 to 116 of the truck 111 are generated from the coils 105U, 105V, and 105W of the respective phases. The truck 111 is moved by the generated thrust.

Subsequently, the control of FIG. 5B will be described. In FIG. 5B, the truck 111 is located near a boundary between the coil units 101 and 102 and the truck 112 is located near a boundary between the coil units 103 and 104, respectively. In FIG. 5B, the position P2 indicates a stop position of the truck 111 and the position P3 indicates a stop position of the truck 112. The truck 111 stops in such a manner that a center of the magnet 115 of the truck 111 coincides with the position P2. In FIG. 5B, since processes are common to those in steps S601 to S603 in FIG. 6 described in FIG. 5A, their description is omitted. In FIG. 5B, the control of the truck 111 which is made by the motor controller 130 and the control of the truck 112 which is made by the motor controller 140 are common. Therefore, the control of the truck 111 which is made by the motor controller 130 will be described hereinbelow.

The motor controller 130 arithmetically operates control deviation information as a difference between the target position of the truck 111 and the present position of the truck 111 detected by the optical encoder 161 (step S604). From the position of the truck 111 which was input to the control deviation calculator 132, the motor controller 130 can detect that the positional relation between the position of the truck 111 and the coil unit 101 became the position P2 as a stop position which has been preset into the motor controller.

On the basis of the control deviation information calculated by the control deviation calculator 132, the position controller 133 arithmetically operates current control information and forms a current control information exchange signal (step S605). The current control information exchange signal which is formed in step S605 is such a signal that the current information selector 125 can select the current controllers 121 and 125 necessary to stop the truck 111 at the position P2. The current control information which is obtained in step S605 is one current control information irrespective of the number of current controllers which are selected. The motor controller 130 transmits the obtained current control information and the formed current control information exchange signal to the current information selector 125 (step S606).

On the basis of the current control information exchange signal received from the motor controller 130, the current information selector 125 selects the two current controllers 121 and 122 from the current controllers 121 to 124 and switches them, and transmits the current control information (step S607). On the basis of the received current control information, the current controllers 121 and 122 supply driving currents to the coil units 101 and 102 (step S608). In the coil units 101 and 102 to which the driving currents were supplied, magnetic forces adapted to absorb magnetic forces of the magnets 114 to 116 are generated from the coils 105U, 105V, and 105W of the respective phases.

In FIG. 5B, the two current controllers 121 and 122 are driven by one current control information transmitted from the motor controller 130 and one truck 111 stops at the stop position P2. Thus, the truck 111 can be stopped at a high precision in a short time. For example, the truck 111 can be stopped from the target stop position P2 at a precision of a few μm for a period of time of tens of milliseconds after the truck 111 reached the stop target position P2.

After the trucks 111 and 112 illustrated in FIG. 5B were stopped, the running controller 20 transmits a start signal for instructing that the movement of the trucks is started in a lump to all of the motor controllers. Each motor controller receives the start signal through the controller. Thus, the trucks 111 and 112 illustrated in FIG. 5B start the movement to the next stop target position.

Subsequently, FIG. 5C will be described. FIG. 5C differs from FIG. 5A with respect to a point that the new truck 113 enters and the truck 111 moves over the coil units 102 and 103. Other control is common. Therefore, a description of the common portions is omitted.

Although the truck 111 moves to the control areas 402 and 403 which are driven by the two coil units 102 and 103 in FIG. 5C, the motor controller 130 continuously controls the truck 111. Similarly, the motor controller 140 continuously controls the truck 112. The control of the truck 111 which moves over the coil units 102 and 103 will be described hereinbelow.

Since the truck 111 has entered the control area 402 of the coil unit 102, the optical encoder 162 detects the position of the truck 111 (step S601). The controller 170 determines whether or not the truck 111 detected by the optical encoder 162 is a truck which has entered newly (step S602). Since the truck 111 is not the truck which has entered newly (NO in step S602), the processing routine advances to step S604.

The motor controller 130 arithmetically operates the control deviation information as a difference between the target position of the truck 111 and the position of the truck 111 detected by the optical encoder 162 (step S604). From the position of the truck 111 which was input to the control deviation calculator 132, the motor controller 130 can detect that the position of the truck 111 became the position over the coil units 102 and 103.

The position controller 133 arithmetically operates the current control information so that the truck 111 can move over the coil units 102 and 103 and the current information selector 125 forms such a current control information exchange signal that the current information selector 125 can select the current controllers 122 and 123 (step S605). As mentioned above, the current control information which is obtained in step S605 is one current control information irrespective of the number of current controllers which are selected. The motor controller 130 transmits the arithmetically operated current control information and the formed current control information exchange signal to the current information selector 125 (step S606).

The current information selector 125 switches the current controllers from the current controllers 121 and 122 to the current controllers 122 and 123 on the basis of the current control information exchange signal received from the motor controller 130 and transmits the current control information to the current controllers 122 and 123 (step S607). The current controllers 122 and 123 supply the driving currents to the coil units 102 and 103 on the basis of the current control information received from the current information selector 125, respectively (step S608). In the coil units 102 and 103 to which the driving currents were supplied, magnetic forces which repel magnetic forces of the magnets 114 to 116 of the truck 111 are generated from the coils 105U, 105V, and 105W of the respective phases. The truck 111 is moved by the generated thrust.

Subsequently, the control of the truck 113 which enters from the adjacent linear motor control apparatus 10a will be described. The position of the truck 113 which entered newly the control area 401 which can be controlled by the coil unit 101 is detected by the optical encoder 161 (step S601). The controller 170 determines whether or not the truck 113 detected by the optical encoder 161 is a new truck (step S602). The controller 170 determines that the truck 113 is the new truck which entered the linear motor module 10b (YES in step S602) and allocates the motor controller 150 which is in the rest state to the truck 113 (step S603). In detail, the processes will be described with reference to the flowchart shown in FIG. 7.

The flowchart shown in FIG. 7 relates to the processes which are executed by the controller 170 and is started when the controller 170 has detected that the position information of the new truck was detected by the optical encoder 161.

The controller 170 determines whether or not the motor controller 130 is controlling the truck or is in the rest state (step S701). When the motor controller 130 is in the rest state (YES in step S701), the controller 170 allocates the truck 113 detected by the optical encoder 161 to the motor controller 130 (step S702). The controller 170 transmits the allocated information as an allocation signal to the position information selector 165.

When the motor controller 130 is controlling the truck (NO in step S701), the controller 170 determines whether or not the motor controller 140 is controlling the truck or is in the rest state (step S703). When the motor controller 140 is in the rest state (YES in step S703), the controller 170 allocates the truck 113 detected by the optical encoder 161 to the motor controller 140 (step S704). The controller 170 transmits the allocated information as an allocation signal to the position information selector 165.

When the motor controller 140 is controlling the truck (NO in step S703), the controller 170 determines whether or not the motor controller 150 is controlling the truck or is in the rest state (step S705). When the motor controller 150 is in the rest state (YES in step S705), the controller 170 allocates the truck 113 detected by the optical encoder 161 to the motor controller 150 (step S706). The controller 170 transmits the allocated information as an allocation signal to the position information selector 165.

On the other hand, when the motor controller 150 is controlling the truck (NO in step S705), this means that the motor controller to which the truck 113 detected by the optical encoder 161 can be allocated does not exist. Therefore, the controller 170 transmits error information to the running controller 20 (step S707). The running controller 20 which received the error information from the controller 170 may, for example, stop the control of the trucks of all of the linear motor modules 10a to 10N. In FIG. 5C, the motor controller 150 is allocated to the position information of the truck 111.

The motor controller 150 obtains, through the position information selector 165, the position information of the truck 113 detected by the optical encoder 161. The position commander 151 outputs position command information corresponding to the target position illustrated in FIG. 4B to the control deviation calculator 152. The control deviation calculator 152 arithmetically operates control deviation information serving as a difference between the target position which was input from the position commander 151 and the position information of the truck 113 detected by the optical encoder 161 (step S604).

The position controller 153 arithmetically operates current control information including a magnitude and a direction of the current on the basis of the control deviation information and forms a current control information exchange signal for selecting the current controller (step S605). In FIG. 5C, since the truck 113 is located in the control area 401 of the coil unit 101, the position controller 153 forms such a current control information exchange signal that the current information selector 125 can select the current controller 121. The motor controller 150 transmits the current control information and the current control information exchange signal to the current information selector 125 (step S606).

On the basis of the current control information exchange signal received from the motor controller 150, the current information selector 125 selects the current controller 121 and transmits the current control information to the current controller 121 (step S607). The current controller 121 supplies a driving current to the coil unit 101 on the basis of the current control information received through the current information selector 125 (step S608). In the coil unit 101 to which the driving current was supplied, the magnetic forces which repel the magnetic forces of the magnets 114 to 116 of the truck 113 are generated from the coils 105U, 105V, and 105W of the respective phases. The truck 113 is moved by the generated thrust.

As mentioned above, the truck 113 is controlled by the motor controller 150, current controller 121, coil unit 101, current information selector 125, and position information selector 165 shown by double lines in FIG. 5C.

The truck 112 illustrated in FIG. 5C moves to the linear motor module 10c adjacent to the linear motor module 10b. The motor controller 140 which has controlled the truck 112 transmits control state information showing that it is in the rest state to the controller 170.

After the control state illustrated in FIG. 5C, the motor controller 140 is shifted to the control state illustrated in FIG. 5D. In FIG. 5D, the trucks 111 and 113 are controlled based on the flowchart of FIG. 6 in a manner similar to FIGS. 5A to 5C. The positions P2 and P3 illustrated in FIG. 5D are the stop positions of the trucks 111 and 113 in a manner similar to FIG. 5B. In FIG. 5D, although the truck 111 moves to the control areas 403 and 404 which are driven by the coil units 103 and 104, the motor controller 130 continuously controls the truck 111. Similarly, the motor controller 150 continuously controls the truck 113. The motor controller 140 shown by a broken line is in the rest state in association with the movement of the truck 112. The optical encoders 162 and 164 enter a state where they do not contribute to the control of the trucks.

The control which is made by the motor controllers 130 and 150 is common to the processes described in FIG. 5B but merely differs with respect to a point that the optical encoders for detecting the positions of the trucks, the current controllers for supplying the currents, and the coil units differ. Therefore, a description of the control of FIG. 5D is omitted here. In FIG. 5D, by making the control in a manner similar to FIG. 5B, after the truck 111 reached the stop target position P3, it can stop in a short time. Similarly, after the truck 113 reached the stop target position P1, it can stop in a short time.

After that, when all of the motor controllers existing in the linear motor control system 1 receive the start signal transmitted from the running controller 20, the trucks 111 and 113 illustrated in FIG. 5D start the movement from the stop position to the next target position. When a new truck (not shown) enters the control range of the linear motor module 10b, the motor controller 140 in the rest state is allocated and the motor controller 140 controls the new truck. The control of the trucks in FIG. 5D and subsequent diagrams is repetitively made in accordance with the foregoing control.

As mentioned above, in the embodiment, since the current information selector 125 switches the current controllers which input the current control information, it can select and switch one or a plurality of current controllers serving as input destinations of each current control information for a plurality of current control information. When a plurality of current controllers are selected by the current information selector 125, each current controller supplies the driving current to the corresponding coil units on the basis of one current control information. Thus, one or a plurality of coil units can be driven in accordance with the position of the truck. Even when the truck is located near the boundary between the coil units, the driving currents which are almost equal can be supplied to each coil unit. Therefore, the magnetic forces which are generated from a plurality of coil units are almost equal, a repulsion or an attraction which acts on the truck from each coil unit are also almost equal, and the operation of the truck becomes stable. Therefore, a plurality of trucks which move at a high speed can be controlled at a high precision.

Since the trucks can be stopped at a high precision even near the boundary between the coil units, the restriction of the stop position of the truck in the linear motor module can be reduced. Since the same motor controller controls the truck until the truck which entered one linear motor module is ejected, there is no need to switch the motor controllers and the truck can be controlled at a higher speed. Therefore, the movement and stop of all of the trucks existing in the linear motor module can be controlled. In the embodiment, a series of control for moving and stopping all of the trucks at tens of kHz, for example, 10 kHz can be repeated.

Second Embodiment

A linear motor control system according to the second embodiment of the invention will be described hereinbelow. The second embodiment differs from the first embodiment with respect to a point that, in the linear motor module, a combination as motor controllers is abandoned and a control deviation information selector is provided in place of the current information selector. Other construction is common. Therefore, the same component elements as those in the first embodiment are designated by the same reference numerals and their description is omitted here.

Figure 8:
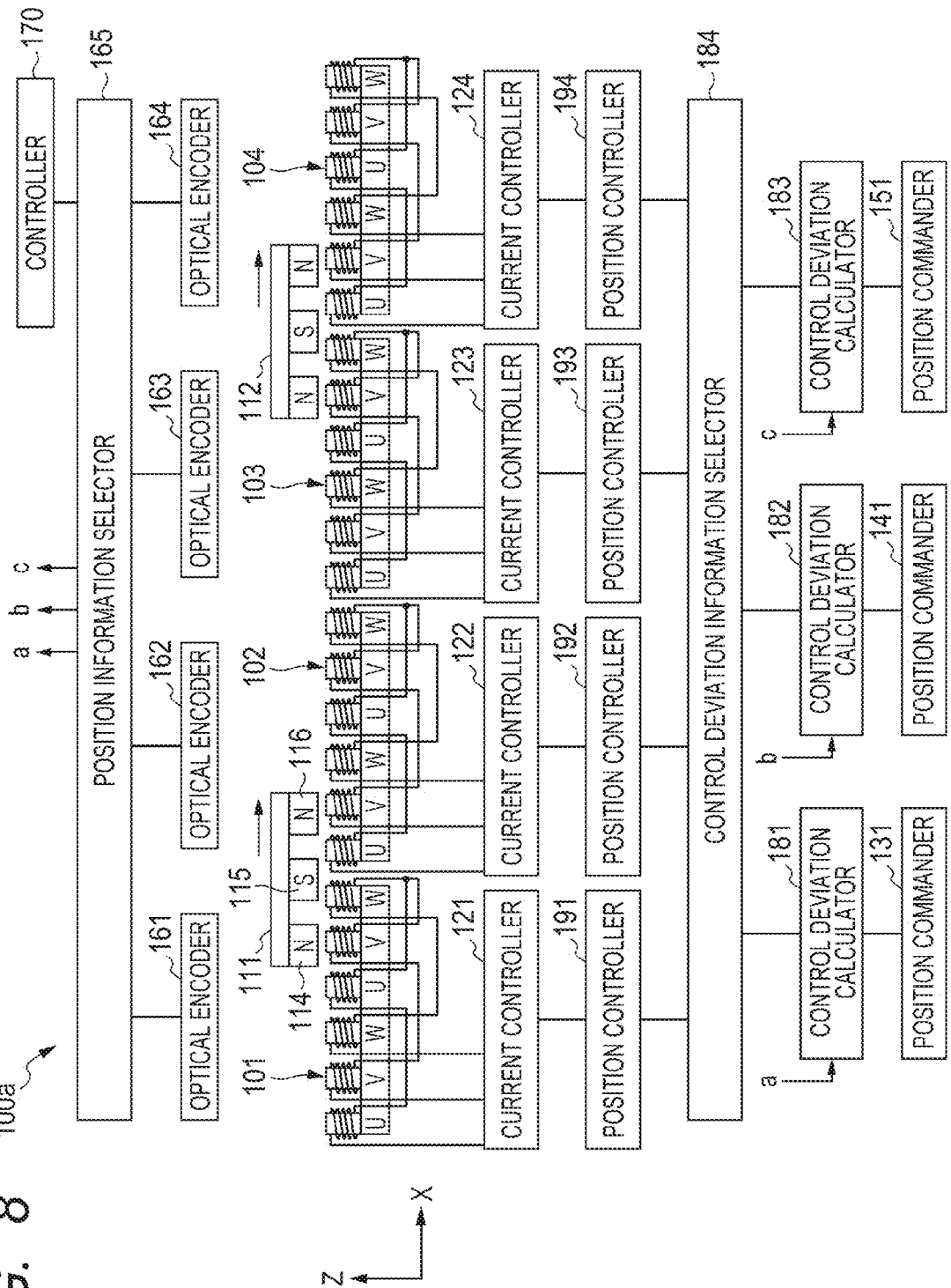
FIG. 8 is a schematic constructional diagram of a linear motor module according to the second embodiment of the invention.

FIG. 8 is a schematic constructional diagram of the linear motor module 100a according to the second embodiment of the invention. As illustrated in FIG. 8, control deviation calculators 181 to 183 are connected to a control deviation information selector 184 as a switching unit. The control deviation information selector 184 is connected to position controllers 191 to 194. The position controllers 191 to 194 are connected to the current controllers 121 to 124, respectively.

The control deviation calculators 181 to 183 arithmetically operate control deviation information serving as differences between the target positions of the trucks which were input from the position commanders 131, 141, and 151 and the present positions of the trucks which were transmitted from the optical encoders 161 to 164, respectively. The control deviation calculators 181 to 183 form control deviation information exchange signals to select one or a plurality of position controllers 191 to 194 for driving the coil units necessary to control the truck as a control target and transmit to the control deviation information selector 184.

On the basis of the control deviation information exchange signals which were input from the control deviation calculators 181 to 183, the control deviation information selector 184 selects and switches one or a plurality of position controllers 191 to 194 as input destinations of the control deviation information which is output from the control deviation calculators 181 to 183. The control deviation information selector 184 transmits the control deviation information to the position controller combined with any one of the control deviation calculators 181 to 183. On the basis of the control deviation information, the position controller which received the control deviation information from the control deviation information selector 184 arithmetically operates current control information necessary to control the trucks and transmits to the corresponding current controller. The driving profile transmitted from the running controller 20 may be stored into a memory (not shown) which can be accessed from the position commanders 131, 141, and 151.

Figure 9:
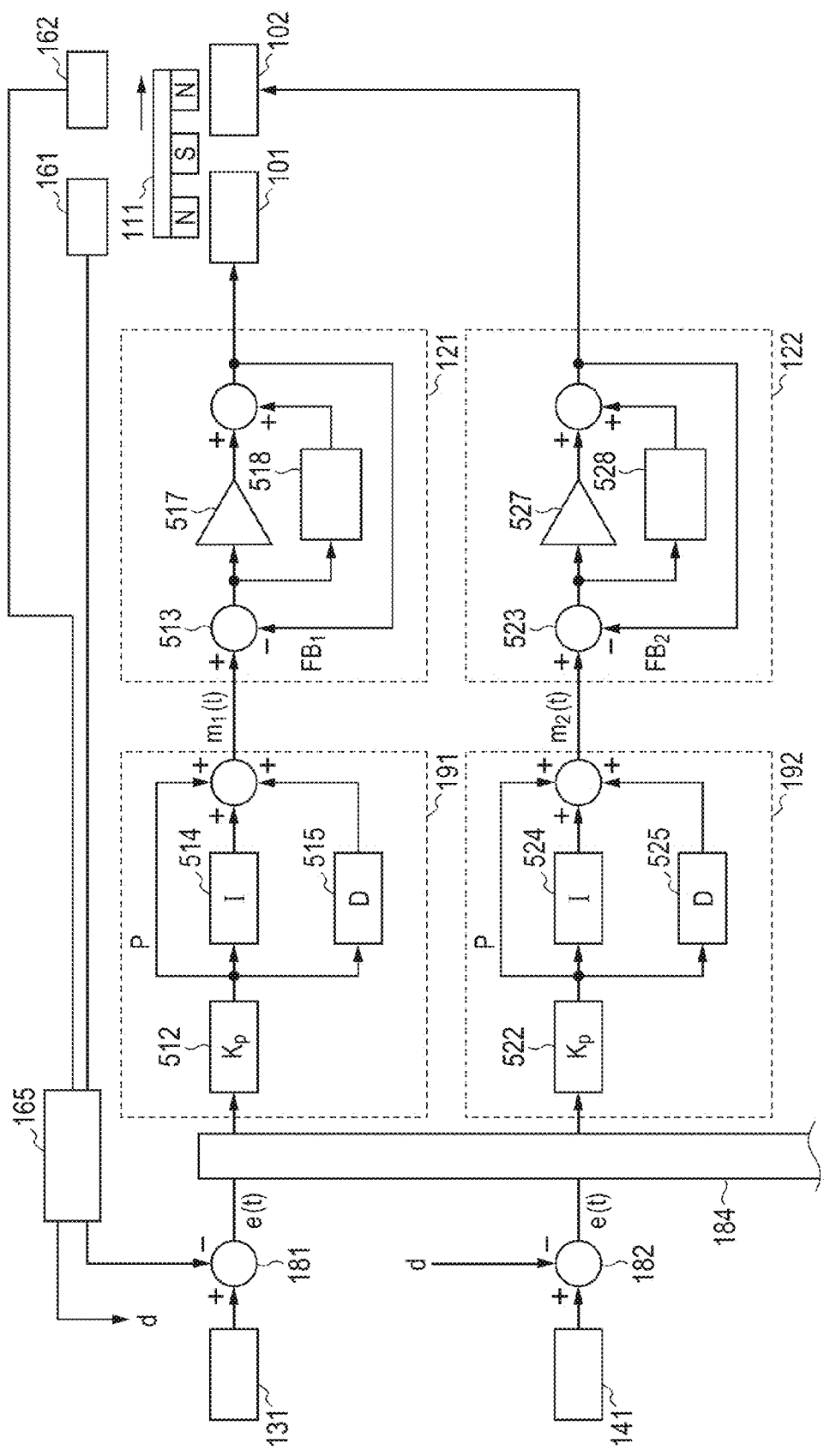
FIG. 9 is a detailed diagram of position controllers and current controllers in the linear motor module illustrated in FIG. 8.

FIG. 9 is a detailed diagram of the position controllers and the current controllers in the linear motor module 100a in the embodiment. The truck control in the embodiment will now be described in detail with reference to FIG. 9. A symbol d in FIG. 9 denotes that it is coupled with the corresponding symbol d. The truck 111 operates in response to a position control command which is transmitted from the position commander 131. In FIG. 9, the position commander 141 is in a rest state where the truck control is not made.

The position of the truck 111 is detected by the optical encoders 161 and 162. The optical encoders 161 and 162 transmit the detected position information to the position information selector 165. The position information selector 165 transmits the present position of the truck 111 detected by the optical encoder 161 to the control deviation calculator 181.

The control deviation calculator 181 calculates a difference between the position control command which is output from the position commander 131, that is, the target position of the truck 111 and the received position and arithmetically operates control deviation information e(t). The control deviation calculator 181 forms a control deviation information exchange signal so as to output the control deviation information e(t) from the control deviation information selector 184 to the position controllers 191 and 192, and transmits the control deviation information and the control deviation information exchange signal to the control deviation information selector 184.

The position controllers 191 and 192 perform PID control. Proportional gains 512 and 522 are input to integration calculators 514 and 524 and differential calculators 515 and 525, respectively. The integration calculators 514 and 524 perform a calculation of the following expression (1).

$$\frac{1}{T_I} \int_{t-\tau}^{t} e(t)\,dt \qquad (1)$$

In the expression (1), $T_I$ denotes an integral time, t indicates a time, and τ denotes a time interval to perform an integration, respectively.

The differential calculators 515 and 525 perform a calculation of the following expression (2).

$$T_D \frac{de(t)}{dt} \qquad (2)$$

In the expression (2), $T_D$ denotes a differential time.

Sums obtained from calculation results of the expressions (1) and (2) and the proportional gains 512 and 522 are current control information $m_1(t)$ and $m_2(t)$, respectively. Now, assuming that current control information is expressed by m(t), it is obtained by the following equation (3).

$$m(t) = K_P \left\{ e(t) + \frac{1}{T_I} \int_{t-\tau}^{t} e(t)\,dt + T_D \frac{de(t)}{dt} \right\} \qquad (3)$$

In the equation (3), $K_P$ denotes a proportional gain.

The current control information $m_1(t)$ and $m_2(t)$ are calculated by using the equation (3) and the current control information $m_1(t)$ and $m_2(t)$ are input to the current controllers 121 and 122, respectively.

The current controllers 121 and 122 have current deviation calculators 513 and 523, current information proportional units 517 and 527, and current information integrators 518 and 528, respectively. The current information proportional units 517 and 527 perform a gain adjustment by parameters which can be arbitrarily set. Current feedback information $FB_1$ and $FB_2$ are information based on the driving currents of the respective phases of the U phase, V phase, and W phase and are input to the current deviation calculators 513 and 523, respectively.

A control method of the current controllers will be described by using the current controller 121. Since the current controller 122 has a construction similar to that of the current controller 121, its description is omitted.

The current deviation calculator 513 calculates a difference between the current control information $m_1(t)$ and the current feedback information $FB_1$. On the basis of the difference between the current control information $m_1(t)$ and the current feedback information $FB_1$, the current information proportional unit 517 performs a proportional calculation and the current information integrator 518 performs an integral calculation. On the basis of the sum of a proportional calculation result calculated by the current information proportional unit 517 and an integral calculation result calculated by the current information integrator 518, that is, on the basis of the current control information, the current controller 121 supplies driving currents to the coils 105U, 105V, and 105W of the respective phases provided for the coil unit 101. Thus, the magnetic forces are generated in the coils 105U, 105V, and 105W of the respective phases. By the magnetic forces of the magnets 114 to 116 and the magnetic forces generated in the coils 105U, 105V, and 105W of the respective phases, the truck 111 is moved to a position where a balance of the magnetic force relation can be obtained, that is, to a stable magnetic field.

Figure 11:
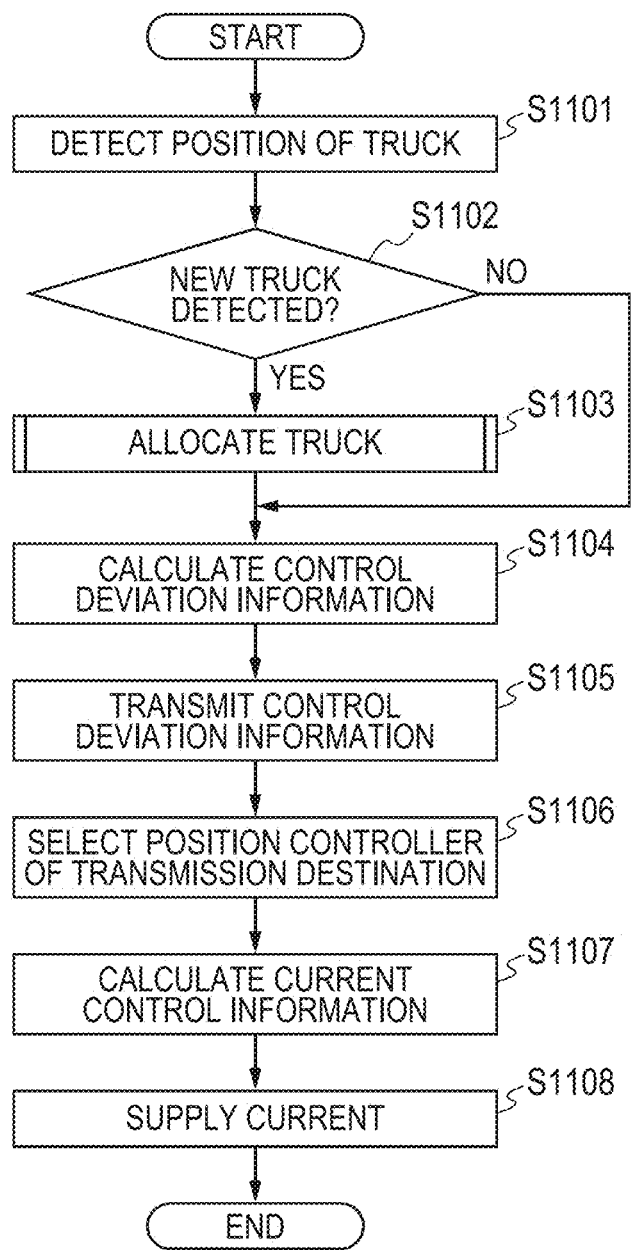
FIG. 11 is a flowchart illustrating control of the trucks according to the second embodiment of the invention.
Figure 12:
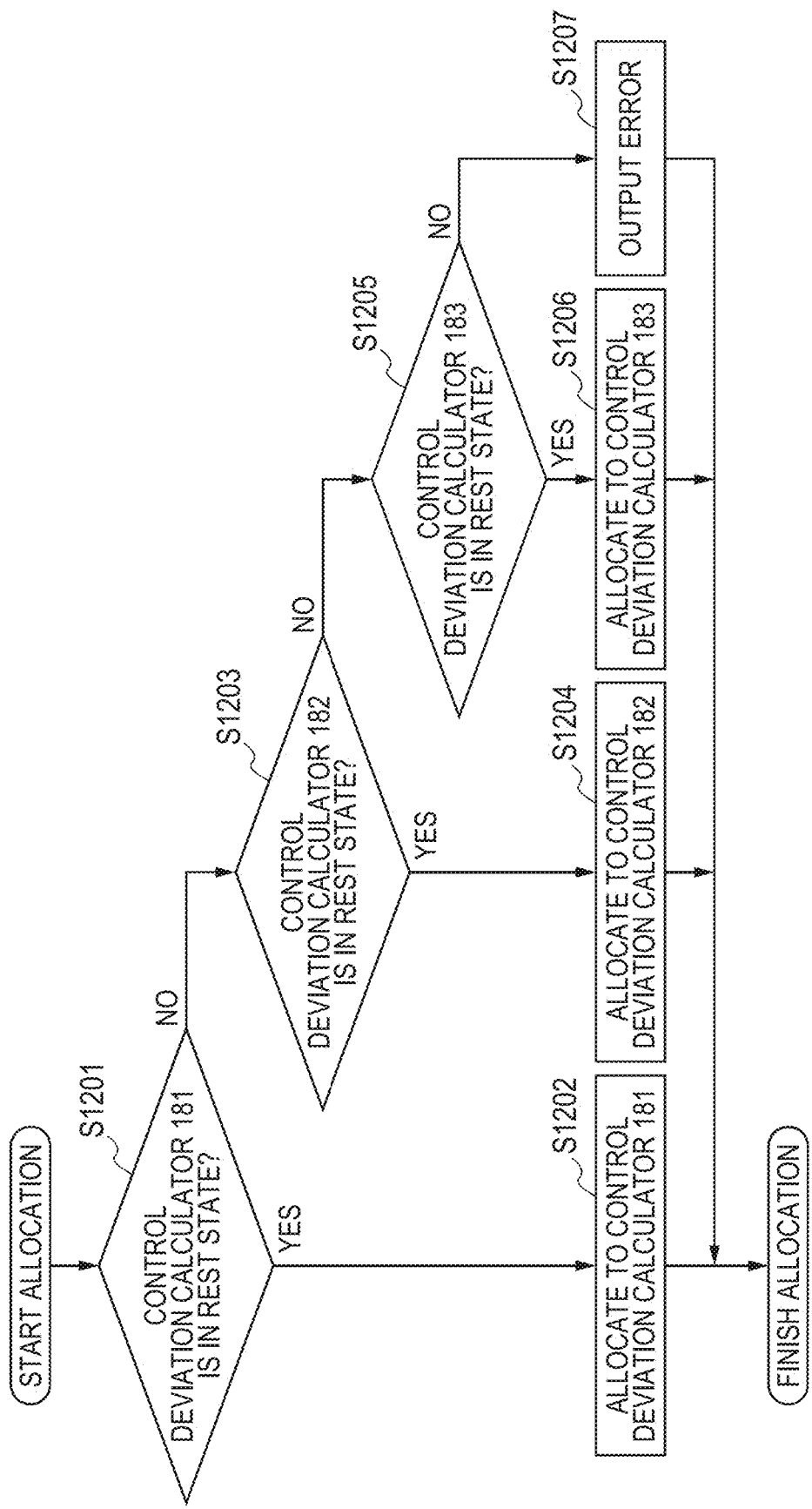
FIG. 12 is a flowchart illustrating an allocating process of the trucks illustrated in FIG. 11.

The control of the linear motor module according to the embodiment will now be described. FIG. 10A shows a control state illustrating the movement of the trucks 111 and 112. FIG. 10B shows a control state illustrating the stop of the trucks 111 and 112. FIG. 10C shows a control state at the time when the new truck 113 has entered. FIG. 10D shows a control state illustrating the stop of the trucks 111 and 113. FIG. 11 is a flowchart illustrating the control of the trucks according to the embodiment. FIG. 12 is a flowchart illustrating an allocating process of the trucks in FIG. 11. The control will now be described hereinbelow with reference to FIGS. 10 to 12. In FIGS. 10A to 10D, the positional relations between the trucks and the coil units in the case of moving a plurality of trucks by controlling them and the control state of each controller for controlling the truck are time-sequentially shown. In FIGS. 10A to 10D, the control states in the linear motor module 100b are illustrated. It is assumed that the linear motor module 100b is located adjacently between the linear motor modules 100a and 100c. In a flowchart illustrated in FIG. 11, a process of step S1101 is common to step S601 in FIG. 6 described in the first embodiment. Therefore, a description of common portions is omitted.

As illustrated in FIG. 10A, when the truck 111 is located in an area which can be controlled only by the coil unit 101, the control of the truck 111 is made by the position commander 131, control deviation calculator 181, position controller 191, and current controller 121. In FIG. 10A, it is assumed that the control deviation calculator and the position commander have already been allocated to the trucks 111 and 112. A description of steps S1101 to S1103 in FIG. 11 is omitted. Since the control to the trucks 111 and 112 is the same, only the control to the truck 111 will be described.

The control deviation calculator 181 calculates the control deviation information e(t) serving as a difference between the target position of the truck 111 which was input from the position commander 131 and the present position of the truck 111 (step S1104). In step S1104, the control deviation information selector 184 also forms a control deviation information exchange signal to select the position controller for controlling the coil units necessary to control the truck 111.

The control deviation calculator 181 transmits the obtained control deviation information e(t) and the formed control deviation information exchange signal to the control deviation information selector 184 (step S1105). On the basis of the control deviation information exchange signal, the control deviation information selector 184 selects the position controller to transmit the control deviation information obtained in step S1104 and transmits the control deviation information to the selected position controller (step S1106). In FIG. 10A, on the basis of the control deviation information exchange signal, the control deviation information selector 184 selects the position controller 191 and transmits the control deviation information obtained in step S1104 to the position controller 191.

On the basis of the received control deviation information, the position controller 191 arithmetically operates the current control information $m_1(t)$ to control the current controller 121 and transmits the arithmetically operated current control information to the current controller 121 (step S1107). The current controller 121 supplies a current to the coil unit 101 on the basis of the received current control information (step S1108).

Subsequently, as illustrated in FIG. 10B, the truck 111 moves to the position which can be controlled by the two coil units 101 and 102. In FIG. 10B, the control differs from FIG. 10A with respect to a point that the truck 111 is controlled by the two coil units. Therefore, a description about steps S1101 to S1103 in FIG. 11 is omitted.

The control deviation calculator 181 calculates the control deviation information e(t) serving as a difference between the target position of the truck 111 which was input from the position commander 131 and the present position of the truck 111 and forms a control deviation information exchange signal (step S1104). The control deviation information exchange signal which is formed in step S1104 is such a signal that the position controllers 191 and 192 are selected.

The control deviation calculator 181 transmits the obtained control deviation information and the formed control deviation information exchange signal to the control deviation information selector 184 (step S1105). On the basis of the received control deviation information exchange signal, the control deviation information selector 184 selects and switches the two position controllers 191 and 192, switches the two position controllers 191 and 192 from the position controller 191, and transmits the received control deviation information e(t) to the two position controllers 191 and 192 (step S1106).

On the basis of the received control deviation information e(t), the position controllers 191 and 192 arithmetically operate the current control information $m_1(t)$ and $m_2(t)$ serving as currents which are supplied to the coil units 101 and 102, respectively (step S1107). The position controller 191 transmits the obtained current control information $m_1(t)$ to the current controller 121. The current controller 121 supplies a driving current to the coil unit 101 on the basis of the current control information $m_1(t)$. The position controller 192 transmits the obtained current control information $m_2(t)$ to the current controller 122. The current controller 122 supplies a driving current to the coil unit 102 on the basis of the current control information $m_2(t)$ (step S1108). A difference between the current control information $m_1(t)$ and $m_2(t)$ in the above control relates only to values which are calculated by the integration calculators 514 and 524.

In the embodiment, the time interval τ during which the integration calculators 514 and 524 perform the integration is set to a time shorter than a time which is required until the truck 111 stops at the stop position after the position controller 192 started the control of the truck 111. Thus, at time when the truck 111 stops at the stop position P2, a difference between the values calculated by the two integration calculators 514 and 524 is sufficiently small and a difference between the two current control information $m_1(t)$ and $m_2(t)$ is also sufficiently small.

On the basis of the current control information $m_1(t)$ and $m_2(t)$, the current controllers 121 and 122 drive the two coil units 101 and 102 by the driving currents which are almost equal. Thus, the truck 111 can be stopped at the position P2 serving as a boundary position between the two coil units 101 and 102 in a short time at a high precision.

Although it is desirable that the current control information $m_1(t)$ and $m_2(t)$ have the same value, even if they do not have the same value, the truck can be stopped at the boundary position between the two coil units in a short time at a high precision so long as such a construction that the two position controllers are controlled based on one control deviation information e(t) is used. So long as such a construction that the two position controllers are controlled based on one control deviation information e(t) is used, a PID control parameter of each position controller can be finely adjusted and, for example, control corresponding to an individual difference caused by an attaching precision of every coil unit can be made.

FIG. 10C differs from FIGS. 10A and 10B with respect to a point that the new truck 113 enters the control range of the coil unit 101 and the truck 112 is ejected from the linear motor module 100b. Therefore, a description of common portions is omitted. First, the entering of the truck 113 will be described hereinafter.

The optical encoder 161 detects the position of the truck 113 (step S1101). The position information of the truck 113 detected by the optical encoder 161 is input to the controller 170 through the position information selector 165. Subsequently, the controller 170 determines whether or not the truck 113 detected by the optical encoder 161 is a new truck (step S1102). The controller 170 determines that the truck 113 is the new truck which entered the linear motor module 100b (YES in step S1102) and executes the allocating process of the truck 113 (step S1103).

As illustrated in FIG. 12, the controller 170 determines whether or not the control deviation calculator 181 is controlling the truck or is in a rest state (step S1201). When the control deviation calculator 181 is in the rest state (YES in step S1201), the controller 170 allocates the truck detected by the optical encoder 161 to the control deviation calculator 181 (step S1202). The controller 170 transmits the allocated information as an allocation signal to the control deviation calculator 181.

When the control deviation calculator 181 is controlling the truck (NO in step S1201), the controller 170 determines whether or not the control deviation calculator 182 is controlling the truck or is in a rest state (step S1203). When the control deviation calculator 182 is in the rest state (YES in step S1203), the controller 170 allocates the truck detected by the optical encoder 161 to the control deviation calculator 182 (step S1204). The controller 170 transmits the allocated information as an allocation signal to the control deviation calculator 182.

When the control deviation calculator 182 is controlling the truck (NO in step S1203), the controller 170 determines whether or not the control deviation calculator 183 is controlling the truck or is in a rest state (step S1205). When the control deviation calculator 183 is in the rest state (YES in step S1205), the controller 170 allocates the truck detected by the optical encoder 161 to the control deviation calculator 183 (step S1206). The controller 170 transmits the allocated information as an allocation signal to the control deviation calculator 183.

When the control deviation calculator 183 is controlling the truck (NO in step S1205), this means that the control deviation calculator to which the truck detected by the optical encoder 161 can be allocated does not exist. Therefore, the controller 170 transmits error information to the running controller 20 (step S1207). In FIG. 10C, since the control deviation calculator 183 is in the rest state, the controller 170 allocates the control deviation calculator 183 to the control of the truck 113. With respect to the truck 113 which entered newly, since the processes in step S1104 and subsequent steps in FIG. 11 are common to those described in FIGS. 10A and 10B, their description is omitted.

The truck 112 illustrated in FIG. 10C moves to the linear motor module 100*c* adjacent to the linear motor module 100*b* by the series of processes illustrated in FIG. 11. The control deviation calculator 182 transmits control state information showing that it entered the rest state where there is no truck as a control target to the controller 170.

The trucks 111 and 113 in FIG. 10D are controlled in accordance with their positions as described in FIGS. 10A and 10B. As illustrated in FIGS. 10A to 10D, the truck which entered the linear motor module 100*b* is continuously controlled by the control deviation information e(t) which is transmitted from one control deviation calculator until the truck is ejected to the outside of the control range of the linear motor module 100*b*.

As mentioned above, in the embodiment, on the basis of the control deviation information exchange signal, the control deviation information selector 184 selects and switches one or a plurality of position controllers which input one control deviation information. Thus, with respect to a plurality of control deviation information, the control deviation information selector 184 can select and switch one or a plurality of position controllers serving as input destinations of each control deviation information. If the plurality of position controllers are selected by the control deviation information selector 184, each position controller arithmetically operates the current control information m(t) on the basis of one control deviation information e(t) and transmits to each current controller. Since each current controller supplies a driving current to the corresponding coil unit on the basis of the current control information m(t), an effect similar to that in the first embodiment can be obtained. Since the controller 170 allocates the truck which entered newly to each of the plurality of control deviation calculators 181 to 183, even if a plurality of trucks are arranged at a high density, each truck can be moved at a high speed and stopped at a high precision. The PID control of the position controllers and the control method of the current controllers described in the embodiment are an example and the control method is not limited by them.

Third Embodiment

Figure 13:
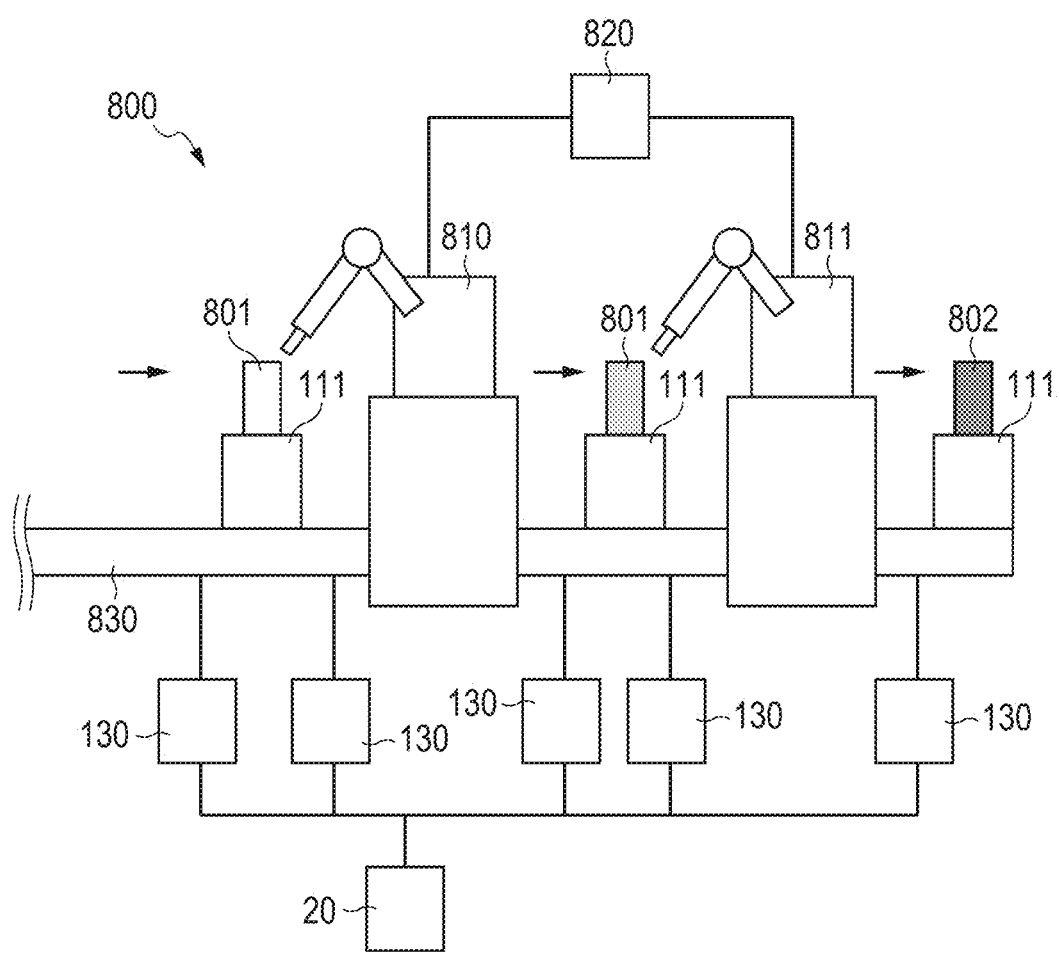
FIG. 13 is a schematic constructional diagram of a manufacturing system according to the third embodiment of the invention.

A manufacturing system 800 of articles according to the third embodiment of the invention will be described with reference to FIG. 13. The manufacturing system 800 of articles has: the linear motor control system 1 according to the first embodiment; processing apparatuses 810 and 811; and a process controller 820. The linear motor control system 1 conveys a work 801 between the processing apparatuses 810 and 811. In this instance, the articles denote, for example, a toner cartridge for an ink jet printer or a copying apparatus, parts for a camera, semiconductor products, and the like. The process controller 820 collects process information of the processing apparatuses 810 and 811 and forms a conveying process of the truck. The number of processing apparatuses 810 and 811 is not limited to two.

A manufacturing method of articles by the manufacturing system 800 will be described. The running controller 20 transmits group conveying commands to the motor controller 130 in a lump at the same timing. The motor controller 130 receives the group conveying commands. In response to those commands, the motor controller 130 arithmetically operates control deviation information on the basis of the information of the target position of the truck which has previously been received from the running controller 20 for the truck which exists in or entered the corresponding linear motor module. The motor controller 130 arithmetically operates current control information on the basis of the deviation information and forms a current control information exchange signal. The current information selector (not shown) switches one or a plurality of current controllers on the basis of the current control information exchange signal. The switched current controllers supply the driving currents to the coil units on the basis of the received current control information. Thus, the truck 111 on a conveying path 830 is conveyed toward the first and second processing apparatuses 810 and 811. The work 801 is grasped and mounted on the truck 111. The processing apparatuses 810 and 811 to which the truck 111 was conveyed execute predetermined processes to the work 801.

For example, if the article to be manufactured is a toner cartridge for an ink jet printer, the work 801 is a cartridge to enclose toner powder. The processing apparatus 810 executes a process for enclosing toner powder for a color ink into the work 801. The processing apparatus 811 executes a process for enclosing toner powder for a black ink into the work 801. Finally, an ink cartridge product is manufactured as an article 802.

As mentioned above, the manufacturing system of articles according to the embodiment can manufacture the articles in accompanied with an advantage of the linear motor control system according to the first embodiment. Thus, not only a manufacturing efficiency of articles can be improved but also manufacturing costs can be reduced. The manufacturing system of articles according to the embodiment can be also applied to the linear motor control system according to the second embodiment.

Although the exemplary embodiments have been described above, the invention is not limited to the foregoing embodiments but various modifications are possible within a scope without departing from the spirit of the invention.

For example, although the first and second embodiments have such a construction that the linear motor modules 10*a* to 10N have the four coil units 101 to 104, it is sufficient to use a linear motor module having two or more coil units and two or more motor controllers. By constructing the system as mentioned above, since each motor controller is allocated every truck which enters the linear motor module, the truck can be precisely stopped even at a boundary between the coil units.

Although the 3-phase linear motor has been used in each of the foregoing embodiments, the invention is not limited to three phases but, for example, a 2-phase linear motor may be used. The number of magnets 114 to 116 is not limited to 3 either.

Although the coil units 101 to 104 are serially connected in the foregoing first and second embodiments, the layout of the coil units is not limited to such a construction but the coil units may be arranged, for example, as illustrated in FIGS. 14A and 14B. FIG. 14A is a top view of the linear motor module. FIG. 14B is a cross sectional view taken along the line 14B-14B in FIG. 14A. As illustrated in FIG. 14A, such a T-type layout that two sets of coil units 101a to 103a and 101b to 103b are arranged so as to sandwich the magnets 114 to 116 of a truck 901 may be used.

If the system has such coil units 101a to 103a and 101b to 103b, the truck 901 has a magnet bracket 902, the magnets 114 to 116, four moving blocks 903, and the scale 205. The moving blocks 903 and the two rails 201 and 201 construct a linear guide. In the case of arranging the coil units in a T shape, the two opposite coil units 101a and 101b are arranged so that a plurality of coils 105 forming the respective phases are serially connected. This is true of the opposite coil units 102a and 102b and the opposite coil units 103a and 103b.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086367, filed on Apr. 18, 2014, which is hereby incorporated by reference herein in its entirety.

What is claimed is:

1. A linear motor control apparatus comprising:
a plurality of coil units which are continuously arranged;
a plurality of position detecting units configured to detect a position of a first truck which moves over the plurality of coil units;
a first deviation calculating unit configured to arithmetically operate deviation information as differences between a value of a position of the first truck detected by at least one of the plurality of position detecting units, and a value of a target position of the first truck;
a plurality of position control units configured to arithmetically operate current control signals on the basis of the deviation information which is arithmetically operated by the first deviation calculating unit;
a plurality of current control units configured to supply driving currents to the coil units on the basis of the current control signals which are arithmetically operated by the position control units; and
a switching unit configured to select one or two adjacent of the current control units on the basis of an output of the first deviation calculating unit.

2. The apparatus according to claim 1, wherein for a period of time during which the first truck moves over the plurality of coil units, on the basis of the deviation information which was arithmetically operated by the first deviation calculating unit, the selected one or two adjacent current control units controls the driving current which is supplied to the coil unit in which the first truck is located.

3. The apparatus according to claim 1, further comprising an allocating unit configured to allocate a second deviation calculating unit for a second truck as it enters the plurality of coil units.

4. The apparatus according to claim 3, further comprising a selecting unit configured to transmit positions of the first truck detected by the position detecting units to the first deviation calculating unit.

5. A linear motor control system comprising:
a plurality of coil units which are continuously arranged;
a plurality of position detecting units configured to detect a position of a first truck which moves over the plurality of coil units;
a first deviation calculating unit configured to arithmetically operate deviation information as differences between a value of a position of the first truck detected by at least one of the position detecting units, and a value of a target position of the first truck;
a plurality of position control units configured to arithmetically operate current control signals on the basis of the deviation information which is arithmetically operated by the first deviation calculating unit;
a plurality of current control units configured to supply driving currents to the coil units on the basis of the current control signals which are arithmetically operated by the position control units;
a running control unit configured to control a running of the first truck by transmitting the target position which is used by the first deviation calculating unit; and
a switching unit configured to select one or two adjacent of the current control units on the basis of an output of the first deviation calculating unit.

6. A linear motor control method comprising:
detecting a position of a first truck which moves over a plurality of coil units;
arithmetically operating deviation information as differences between a value of a position of the first truck detected by at least one of a plurality of position detecting units, and a value of a target position of the first truck by a first deviation calculating unit;

arithmetically operating current control signals by one or two adjacent of a plurality of position control units on the basis of the deviation information which is arithmetically operated by the first deviation calculating unit; and supplying driving currents from one or two adjacent of a plurality of current control units to the plurality of coil units on the basis of the current control signals which are arithmetically operated by one of the position control units.

7. The manufacturing method of articles using the first truck which is controlled by the linear motor control method according to claim 6, comprising:

executing predetermined processes to articles mounted in the first truck, thereby manufacturing the articles.

8. A linear motor control apparatus comprising:

a plurality of coil units which are continuously arranged;

a plurality of position detecting unis configured to detect a position of a first truck which moves over the plurality of coil units;

a first motor controller configured to obtain deviation information on the basis of a value of a position of the first truck detected by at least one of the position detecting units and a value of a target position of the first truck, and to obtain current control signals on the basis of the deviation information;

a plurality of current control units configured to supply driving currents to the plurality of coil units on the basis of the current control signals; and a switching unit configured to select one or two adjacent of the current control units on the basis of the current control signals output by the first motor controller, wherein the selected one or two adjacent of the current control units provides the driving currents for the coil units on the basis of the output of the first motor controller.

9. The linear motor control apparatus according to claim 8, further comprising:

a second motor controller configured to obtain the deviation information on the basis of a value of a position of a second truck detected by one of the position detecting units, and a value of a target position of the second truck, wherein the switching unit selects two adjacent of the current control units for supplying a driving current to each of the coil units on the basis of an output of the second motor controller.

10. The linear motor control apparatus according to claim 9, further comprising:

a running controller configured to transmit a start signal to the first motor controller and the second motor controller.

11. The linear motor control apparatus according to claim 10, wherein the running controller transmits a running command including the target position of the first truck and a target position of the second truck to the first motor controller and the second motor controller.

\* \* \* \* \*